(12) United States Patent
Yamamoto

(10) Patent No.: US 10,409,271 B2
(45) Date of Patent: Sep. 10, 2019

(54) SCHEDULING METHOD AND RECORDING MEDIUM RECORDING SCHEDULING PROGRAM FOR SUBSTRATE PROCESSING APPARATUS

(71) Applicant: DAINIPPON SCREEN MFG. CO., LTD., Kyoto (JP)

(72) Inventor: Masahiro Yamamoto, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 991 days.

(21) Appl. No.: 14/306,454

(22) Filed: Jun. 17, 2014

(65) Prior Publication Data

US 2014/0379113 A1   Dec. 25, 2014

(30) Foreign Application Priority Data

Jun. 20, 2013 (JP) ................................. 2013-129867

(51) Int. Cl.
*G05B 19/418* (2006.01)

(52) U.S. Cl.
CPC ............ *G05B 19/41865* (2013.01); *G05B 2219/32042* (2013.01); *G05B 2219/32265* (2013.01); *Y02P 90/20* (2015.11); *Y02P 90/22* (2015.11)

(58) Field of Classification Search
CPC .... G05B 19/41865; G05B 2219/32042; G05B 2219/32265; Y02P 90/22; Y02P 90/20
See application file for complete search history.

(56) References Cited

U.S. PATENT DOCUMENTS

| 7,445,689 B2 * | 11/2008 | Yoshida ............ H01L 21/67167 156/345.24 |
| 7,620,470 B1 * | 11/2009 | Hickey .............. G05B 19/4184 700/100 |
| 2003/0182084 A1 | 9/2003 | Tanaka et al. ................. 702/184 |
| 2005/0090926 A1 | 4/2005 | Tanaka et al. ................. 700/121 |
| 2005/0090927 A1 | 4/2005 | Tanaka et al. ................. 700/121 |
| 2005/0246124 A1 * | 11/2005 | Tomer ..................... H01L 22/26 702/117 |
| 2006/0162660 A1 | 7/2006 | Shimizu ........................ 118/719 |
| 2006/0165408 A1 * | 7/2006 | Akimoto ........... H01L 21/67173 396/564 |

(Continued)

FOREIGN PATENT DOCUMENTS

| JP | 05-308066 A | 11/1993 |
| JP | 2006-203145 | 8/2006 |

(Continued)

*Primary Examiner* — Nathan L Laughlin
(74) *Attorney, Agent, or Firm* — Ostrolenk Faber LLP

(57) ABSTRACT

A scheduling method includes a first step where a controller prepares the schedule so that a preliminary processing process and a substrate processing process are performed in that order by a processing unit in common, a second step where, when an abnormality occurs in a substrate processing apparatus in a period from the start of the preliminary processing process to before the start of the substrate processing process, the controller stops the substrate processing process at the processing unit designated in the first step, and a third step where, when the abnormality is resolved, the controller prepares the schedule so that a post-resolution preliminary processing process and the substrate processing process are performed in that order at the processing unit designated in the first step.

4 Claims, 31 Drawing Sheets

(56) References Cited

U.S. PATENT DOCUMENTS

| | | | | |
|---|---|---|---|---|
| 2008/0060214 A1* | 3/2008 | Nishimura | ........ | H01L 21/02052 |
| | | | | 34/350 |
| 2010/0197137 A1* | 8/2010 | Sumiya | ............ | H01J 37/32935 |
| | | | | 438/694 |
| 2010/0326354 A1* | 12/2010 | Sahoda | ............ | H01L 21/67766 |
| | | | | 118/712 |
| 2011/0172800 A1* | 7/2011 | Koizumi | ........... | H01L 21/67253 |
| | | | | 700/100 |
| 2011/0208344 A1 | 8/2011 | Matsuyama et al. | ......... | 700/112 |
| 2011/0265813 A1 | 11/2011 | Okai et al. | ..................... | 134/1.1 |
| 2013/0073069 A1 | 3/2013 | Yamamoto et al. | .......... | 700/100 |
| 2013/0078381 A1* | 3/2013 | Miyagi | ............. | H01L 21/67051 |
| | | | | 427/345 |
| 2014/0222187 A1* | 8/2014 | Shirakawa | ........ | H01L 21/67201 |
| | | | | 700/121 |

FOREIGN PATENT DOCUMENTS

| | | |
|---|---|---|
| JP | 2007-266050 A | 10/2007 |
| JP | 2009-164256 A | 7/2009 |
| JP | 2011-176117 A | 9/2011 |
| JP | 2011-233721 A | 11/2011 |
| TW | 200300268 A | 5/2003 |

* cited by examiner

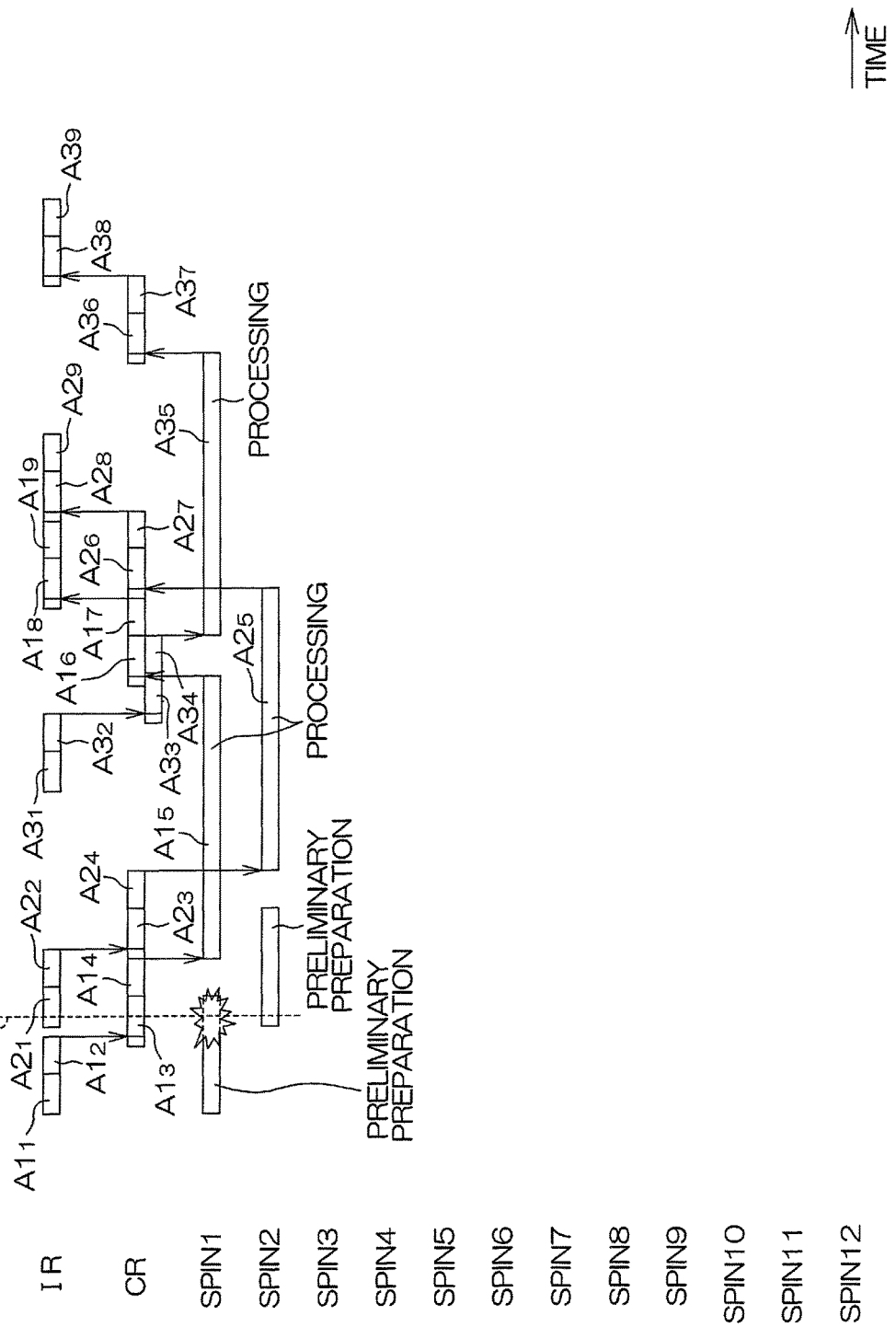

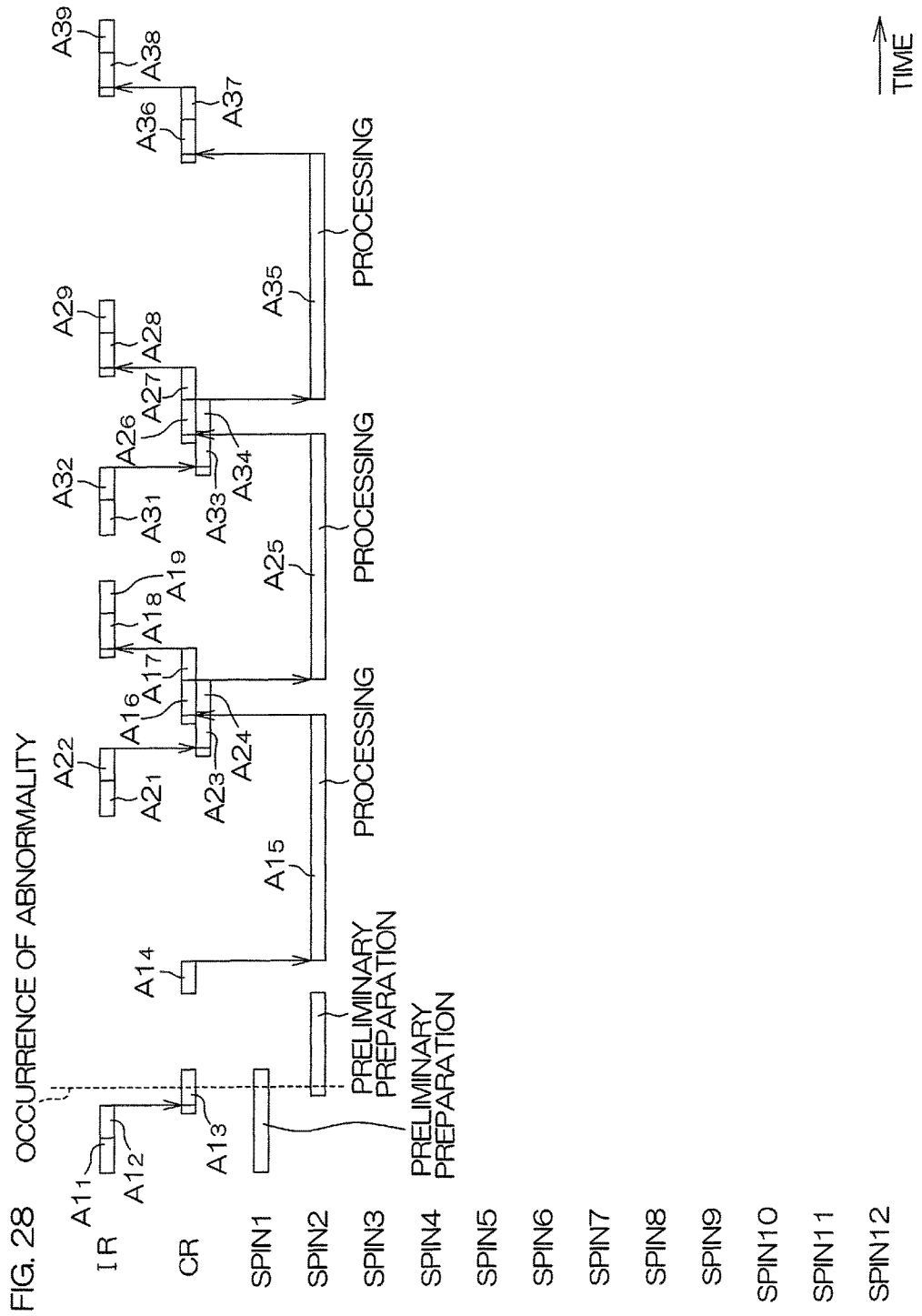

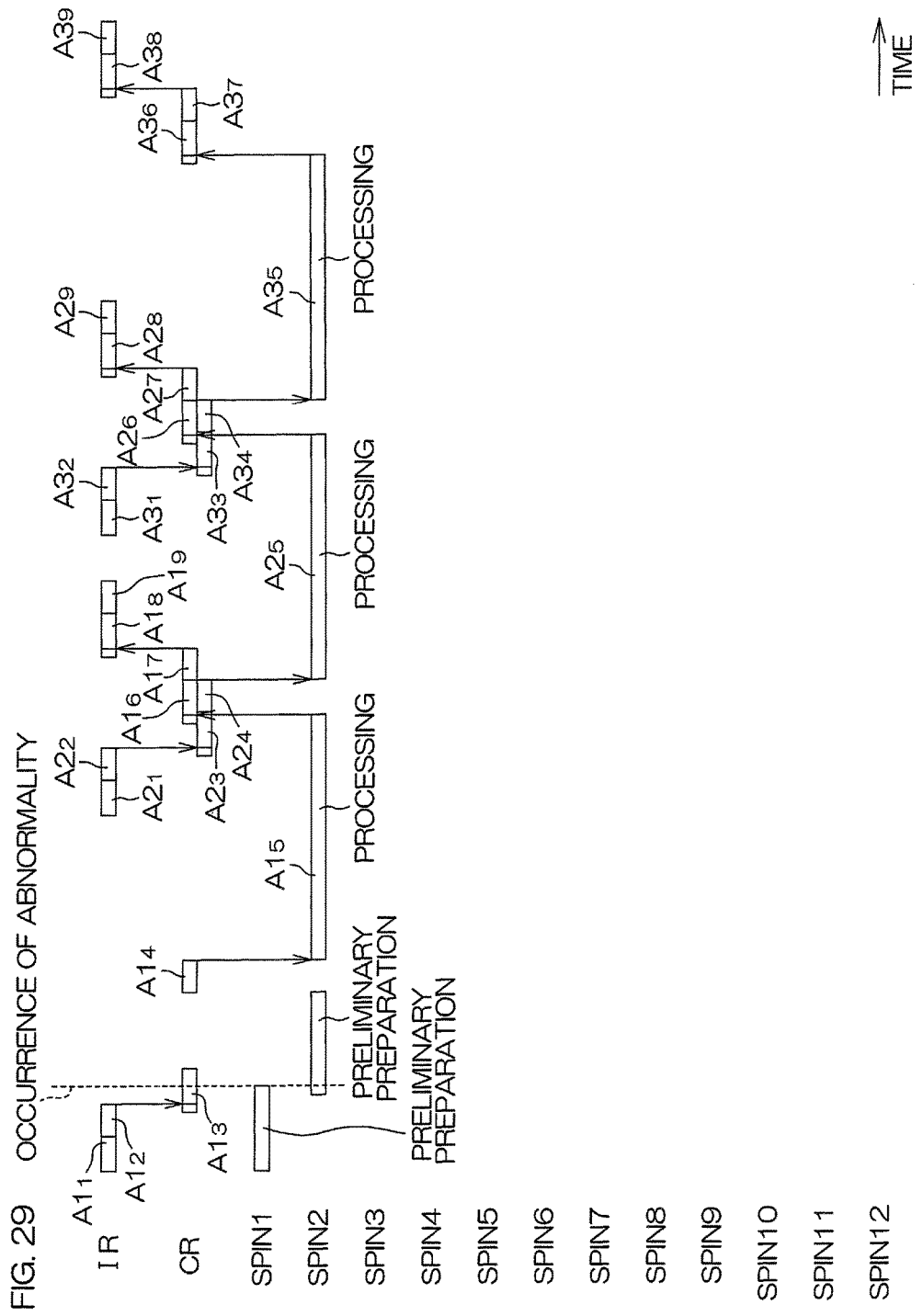

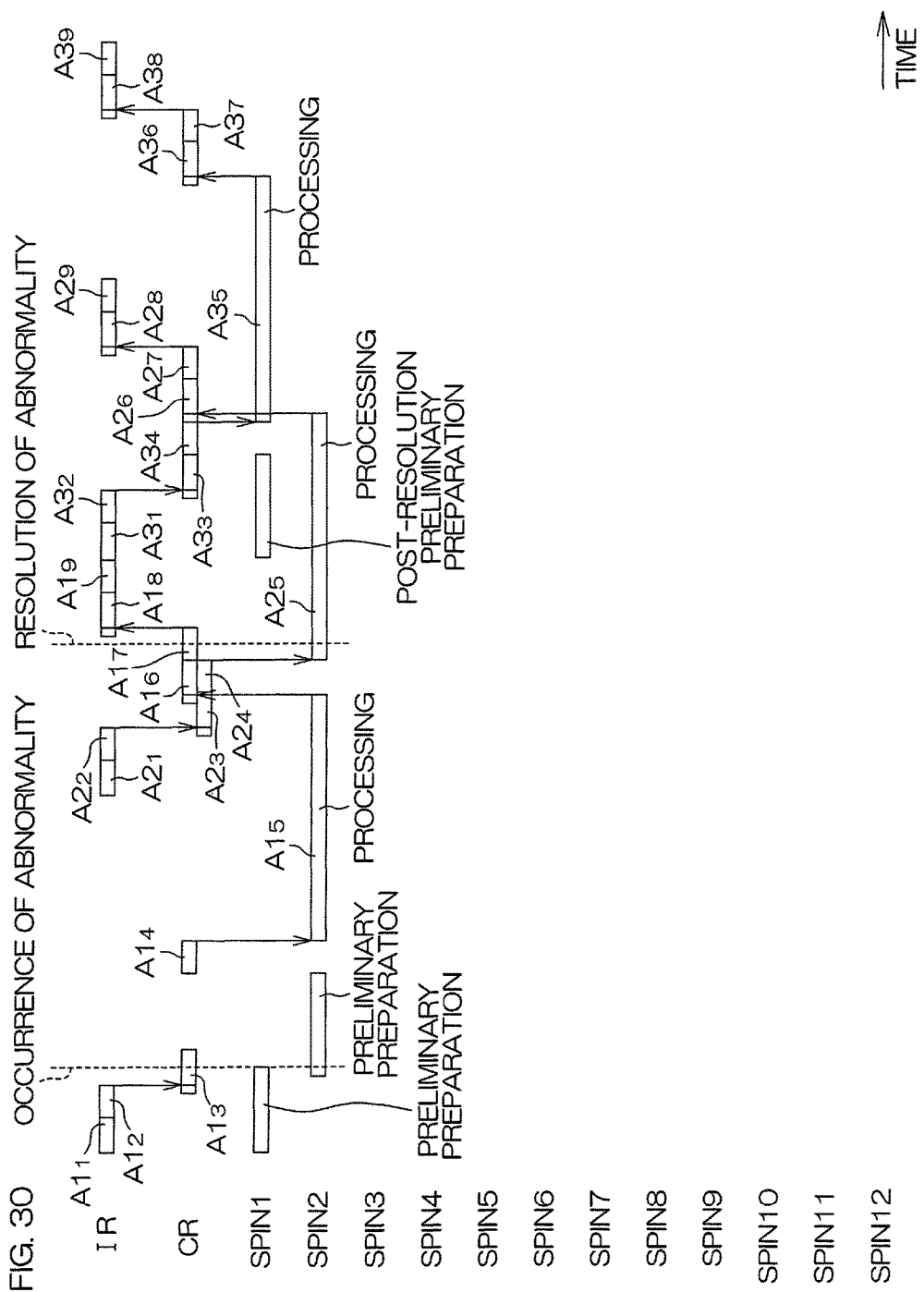

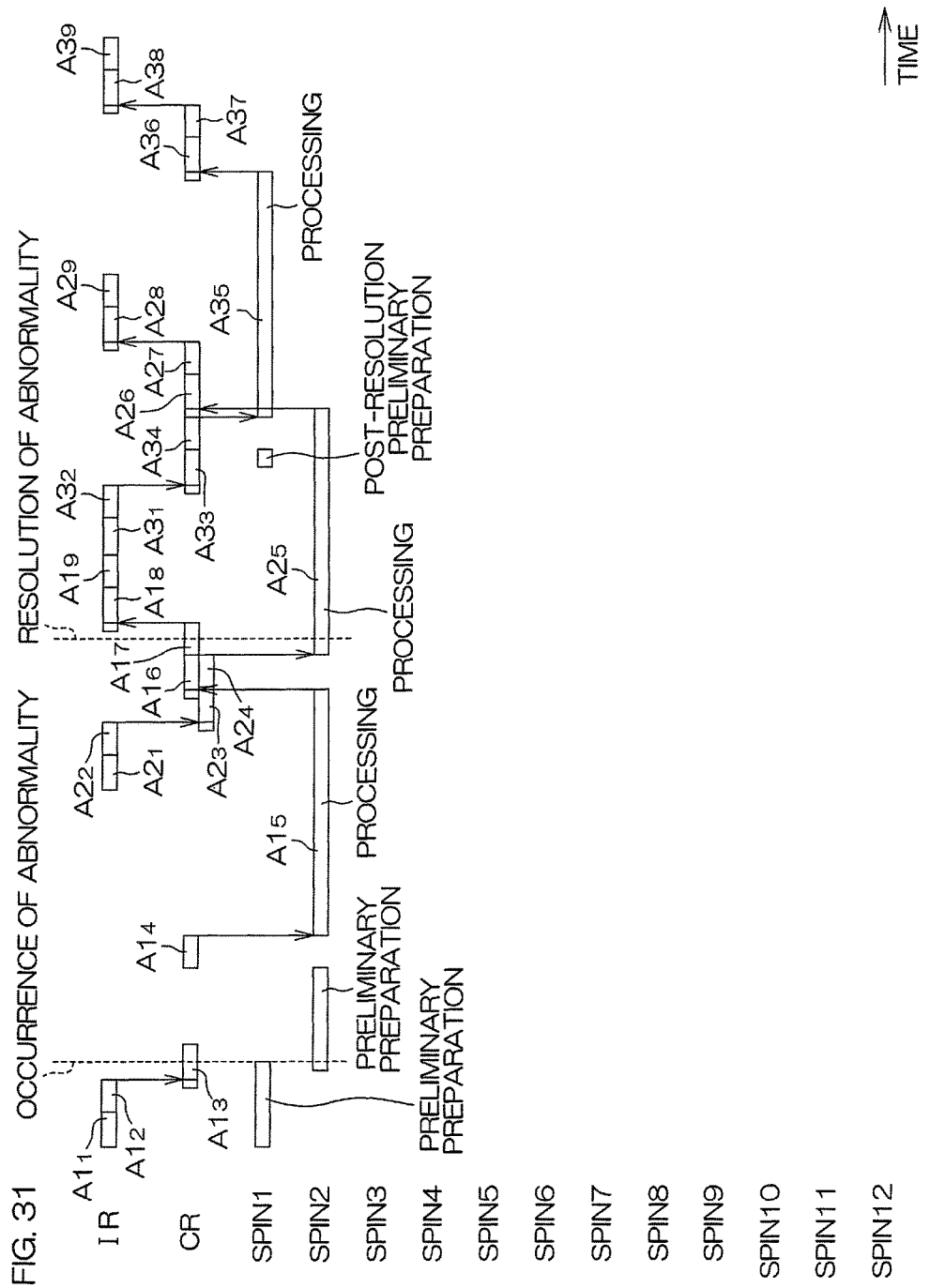

SCHEDULING METHOD AND RECORDING MEDIUM RECORDING SCHEDULING PROGRAM FOR SUBSTRATE PROCESSING APPARATUS

BACKGROUND OF THE INVENTION

1. Field of the Invention

The present invention relates to a method and a computer-readable recording medium recording a program for preparing a schedule that defines operations of a substrate processing apparatus in chronological order. Examples of a substrate to be processed by the substrate processing apparatus include semiconductor wafers, substrates for liquid crystal display devices, substrates for plasma display devices, substrates for FED (field emission display) devices, substrates for optical disks, substrates for magnetic disks, substrates for magneto-optical disks, substrates for photo masks, ceramic substrates, substrates for solar cells, etc.

2. Description of Related Art

In a manufacturing process for a semiconductor device or a liquid crystal display device, etc., a single substrate processing type substrate processing apparatus, by which a substrate, such as a semiconductor wafer or glass substrate for liquid crystal display device, etc., is processed one at a time, or a batch type substrate processing apparatus, by which a lot, constituted of a plurality of substrates, is processed in a batch, is used. US Patent Application Publication No. 2013/073069 discloses a method for preparing a schedule that defines operations of a single substrate processing type substrate processing apparatus in chronological order.

In a period during which a substrate processing apparatus is performing operations according to a schedule, an abnormality may occur in the substrate processing apparatus itself or in a device associated with the substrate processing apparatus, such as an evacuation equipment that evacuates the interior of the substrate processing apparatus, etc., and the schedule may thus have to be stopped in the middle. However, with the abovementioned method, no mention is made of how scheduling is to be performed when an abnormality occurs or when the abnormality is thereafter resolved.

SUMMARY OF THE INVENTION

An object of the present invention is to provide a scheduling method and a recording medium recording a scheduling program for preparing a schedule by which a substrate can be processed with stable quality even when an abnormality occurs in a single substrate processing type substrate processing apparatus or when the abnormality is resolved thereafter.

A preferred embodiment of the present invention provides a scheduling method by which a controller, included in a substrate processing apparatus including at least one single substrate processing type processing unit that processes substrates one at a time, prepares a schedule that defines operations of the substrate processing apparatus. The scheduling method includes a first step where the controller prepares the schedule so that a substrate processing process, in which the processing unit processes a substrate, a preliminary processing process, in which the processing unit performs preparation for the substrate processing process, are performed in the order of the preliminary processing process and the substrate processing process at the same processing unit, a second step where, when an abnormality occurs in the substrate processing apparatus in a period from the start of the preliminary processing process to before the start of the substrate processing process, the controller stops the substrate processing process at the processing unit designated in the first step, and a third step where, when the abnormality is resolved, the controller prepares the schedule so that a post-resolution preliminary processing process, in which the processing unit performs preparation for the substrate processing process, and the substrate processing process are performed in the order of the post-resolution preliminary processing process and the substrate processing process at the processing unit designated in the first step.

With this method, the controller prepares the schedule so that the preliminary processing process and the substrate processing process are performed in that order at the same processing unit. When during execution of the schedule or more specifically during the period from the start of the preliminary processing process to before the start of the substrate processing process, the controller detects the occurrence of an abnormality in the substrate processing apparatus, the execution of the substrate processing process at the processing unit designated in the initial schedule is stopped. That is, the timing of occurrence of abnormality is before the start of the substrate processing process and therefore the execution of the process planned to be later than the point of occurrence of abnormality is stopped.

When the controller detects that the abnormality of the substrate processing apparatus is resolved, the controller prepares the schedule so that the post-resolution preliminary processing process and the substrate processing process are performed in that order at the processing unit designated in the initial schedule. As with the preliminary processing process, the post-resolution preliminary processing process is a process of preparation for the substrate processing process. As mentioned above, the timing of occurrence of abnormality is later than the start of the preliminary processing process and therefore all or a portion of the preliminary processing process will have been executed at the point of occurrence of abnormality. All or a portion of the preliminary processing process and the post-resolution preliminary processing process are thus executed in that order at the same processing unit before the substrate processing process is executed, and the two processes of preparation for the substrate processing process are executed across a time interval.

When the abnormality at the substrate processing apparatus is resolved, the controller prepares the schedule thus so that the process for preparation for the substrate processing process (post-resolution preliminary processing process) is executed anew before the execution of the substrate processing process. If the period from the occurrence of abnormality of the substrate processing apparatus to the resolution of abnormality, that is, the period from the performing of all or a portion of the preliminary processing process to the start of the substrate processing process is long, the effects due to the preliminary processing process will be diminished and the state of the processing unit may change from the state immediately after execution of the preliminary preparation process. Therefore by performing the process for preparation for the substrate processing process anew, degradation of the substrate processing quality can be suppressed or prevented. The substrate processing quality can thereby be stabilized.

In the preferred embodiment of the present invention, the second step may include a step where, when an abnormality occurs in the substrate processing apparatus during the execution of the preliminary processing process, the controller stops a remaining process of the preliminary processing process planned to be performed later than the point of occurrence of abnormality at the processing unit designated in the first step and the substrate processing process at the processing unit designated in the first step.

With this method, when an abnormality of the substrate processing apparatus occurs during the execution of the preliminary processing process, the controller prepares the schedule so that not only the substrate processing process but the remaining process of the preliminary processing process planned to be performed later than the point of occurrence of abnormality is also stopped. The preliminary processing process is a process of preparation for the substrate processing process. Despite this, if the abnormality occurs before the start of the substrate processing process, the substrate processing process at the processing unit designated by the initial schedule is stopped. Therefore, the execution of a process that may be wasteful (the remaining process of the preliminary processing process) can be prevented by the controller preparing the schedule so that the preliminary processing process is interrupted. Lowering of the operation rate of the substrate processing apparatus can thereby be suppressed or prevented.

In the preferred embodiment of the present invention, the post-resolution preliminary processing process may be a process where only the remaining process of the preliminary processing process planned to be performed later than the point of occurrence of abnormality is executed at the processing unit designated in the first step.

With this method, when the abnormality of the substrate processing apparatus is resolved, the controller prepares the schedule so that only the remaining process of the preliminary processing process planned to be performed later than the point of occurrence of abnormality in the initial schedule is executed at the processing unit designated in the initial schedule and the substrate processing process is thereafter executed at the processing unit designated in the initial schedule. The schedule is thus prepared so that the preliminary processing process interrupted by the occurrence of abnormality is restarted practically and all processes included in the preliminary processing process are executed. By only the remaining process of the preliminary processing process being executed as the post-resolution preliminary processing process, the same process can be prevented from being executed a plurality of times. Lowering of the operation rate of the substrate processing apparatus can thereby be suppressed or prevented.

In the preferred embodiment of the present invention, the post-resolution preliminary processing process may be a process of executing all processes included in the preliminary processing process.

With this method, when the abnormality of the substrate processing apparatus is resolved, the controller prepares the schedule so that all processes included in the preliminary processing process are executed as the post-resolution preliminary processing process and the substrate processing process is executed thereafter at the processing unit designated in the initial schedule. That is, the schedule is prepared so that the preliminary processing process is restarted practically from the beginning and the substrate processing process is executed after the post-resolution preliminary processing process corresponding to the preliminary processing process has been executed. The substrate processing process is thus started in a state where sufficient preparation has been made to execute the substrate processing process. The substrate processing quality can thereby be stabilized.

In the preferred embodiment of the present invention, the first step may include a step where the controller designates a plurality of the processing unit and the second step may include a step where, when an abnormality occurs in any one of the plurality of the processing unit, designated in the first step, in the period from the start of the preliminary processing process to before the start of the substrate processing process, the controller prepares the schedule so that the substrate processing process to be executed at the processing unit in which the abnormality occurred is executed at the processing unit differing from the processing unit at which the abnormality occurred.

With this method, when an abnormality occurs in the processing unit, designated in the initial schedule, before the substrate processing process is started at that processing unit, the controller searches for a processing unit, besides the processing unit in which the abnormality occurred, that is capable of executing the substrate processing process. Specifically, if a plurality of the processing units are designated as parallel processing units capable of executing the substrate processing process in a recipe defining a processing condition and a processing procedure for the substrate, the controller searches for a substitutable processing unit from among the parallel processing units. When a substitutable processing unit is found, the controller prepares the schedule so that the substrate processing process is executed at that processing unit. That is, the controller selects a transfer path for transferring the substrate to the processing unit and performs rescheduling in accordance with the selected path. Stagnation of the processing of the substrate can thereby be suppressed and decrease of the throughput (number of substrates processed per unit time) of the substrate processing apparatus can be reduced.

In the preferred embodiment of the present invention, the third step may include a step where the controller changes the contents of the post-resolution preliminary processing process in accordance with the time elapsed from the occurrence of abnormality at the substrate processing apparatus to the resolution of abnormality.

The effects of the preliminary processing process on the substrate processing might change in accordance with the length of stoppage of the substrate processing apparatus. By this method, a change of the above effects can be accommodated. Thus, the substrate processing quality can thus be stabilized.

In the preferred embodiment of the present invention, the contents of the preliminary processing process may be changed in accordance with the contents of the substrate processing.

By this method, a preliminary processing process of contents that are in accordance with the substrate processing contents can be executed. Thus, the substrate processing process is started in a state where sufficient preparation has been made for executing the substrate processing process. The substrate processing quality can thereby be stabilized.

In the preferred embodiment of the present invention, the processing unit may include a processing liquid nozzle discharging a processing liquid to be supplied to the substrate, a processing liquid piping guiding the processing liquid to the processing liquid nozzle, and a temperature adjusting device including at least one of a heater and a cooler and adjusting the temperature of the processing liquid flowing through the processing liquid piping. The preliminary processing process and the post-resolution preliminary processing process may include a pre-dispensing process (prior discharging process) of discharging the processing liquid from the processing liquid nozzle to release the processing liquid remaining in at least one of the processing liquid nozzle and the processing liquid piping.

By this method, the schedule is prepared so that the pre-dispensing process of discharging just a fixed amount of the processing liquid from the processing liquid nozzle is executed before the substrate processing process. By executing the pre-dispensing process in a case of processing a substrate by supplying a temperature-adjusted processing liquid to the substrate, the processing liquid, which remains in the processing liquid nozzle and the processing liquid piping and has changed to a temperature outside a target temperature range, can be released and then the temperature-adjusted processing liquid can be guided to a discharge port of the processing liquid nozzle. By executing a processing liquid supplying process (a portion of the substrate processing process) of discharging the processing liquid to the substrate after the pre-dispensing process, the substrate can be processed by the processing liquid that is temperature-adjusted from the beginning. Precise substrate processing can thereby be realized.

Although the processing liquid that has changed from the initial temperature is released by the execution of the pre-dispensing process, if the time from the end of the pre-dispensing process to the start of the substrate processing process is long, the temperature of the processing liquid inside the processing liquid nozzle and the processing liquid piping will be changed from the initial temperature. As mentioned above, when the controller detects that the abnormality of the substrate processing apparatus is resolved, the controller prepares the schedule so that the process for preparation for the substrate processing process (post-resolution preliminary processing process) is executed anew before the substrate processing process is executed. Therefore, even if the period from the occurrence of abnormality of the substrate processing apparatus to the resolution of abnormality is long, the processing liquid of a temperature within the target temperature range can be supplied to the substrate. The substrate processing quality can thereby be stabilized.

In the preferred embodiment of the present invention, the processing unit may include a cleaning liquid nozzle discharging a cleaning liquid in the interior of the processing unit and a cleaning liquid piping guiding the cleaning liquid to the cleaning liquid nozzle. The preliminary processing process and the post-resolution processing process may include a cleaning process of discharging the cleaning liquid from the cleaning liquid nozzle to clean at least one of the interior of the processing unit and parts disposed in the interior of the processing units.

As in this method, the preliminary processing process may include one or more among the pre-dispensing process, cleaning of the interior of a processing chamber (chamber) included in the processing unit (chamber cleaning process), cleaning of chuck pins holding the substrate (chuck pin cleaning process), and cleaning of other parts inside the processing chamber (parts cleaning process). Similarly, the post-resolution preliminary processing process may include one or more among the pre-dispensing process, the chamber cleaning process, the chuck pin cleaning process, and the parts cleaning process.

By execution of such a preliminary processing process and post-resolution preliminary processing process, imparting of influences of processing of a prior substrate on a substrate that is carried into the processing chamber subsequently can be avoided. Precise substrate processing can thereby be realized. The chamber cleaning includes, for example, cleaning of a spin chuck that holds and rotates the substrate, cleaning of a processing cup that houses the spin chuck, cleaning of a guard (scatter preventing member) that receives processing liquid scattered from the spin chuck, etc.

Another preferred embodiment of the present invention provides a computer-readable recording medium recording a computer program for preparing a schedule that defines operations of a substrate processing apparatus including at least one single substrate processing type processing unit that processes substrates one at a time. The recording medium records a computer program incorporating a group of steps such that the scheduling method described above is executed by the computer as the controller. By this arrangement, the effects described above in relation to the scheduling method can be obtained.

The foregoing and other objects, features and advantages of the present invention will become more apparent from the description of preferred embodiments provided below with reference to the accompanying drawings.

BRIEF DESCRIPTION OF THE DRAWINGS

FIG. 27 is a time chart for describing the third schedule change example.

FIG. 28 is a time chart for describing the third schedule change example.

FIG. 29 is a time chart for describing the third schedule change example.

FIG. 30 is a time chart for describing the third schedule change example.

FIG. 31 is a time chart for describing the third schedule change example.

DETAILED DESCRIPTION OF PREFERRED EMBODIMENTS

Figure 1:
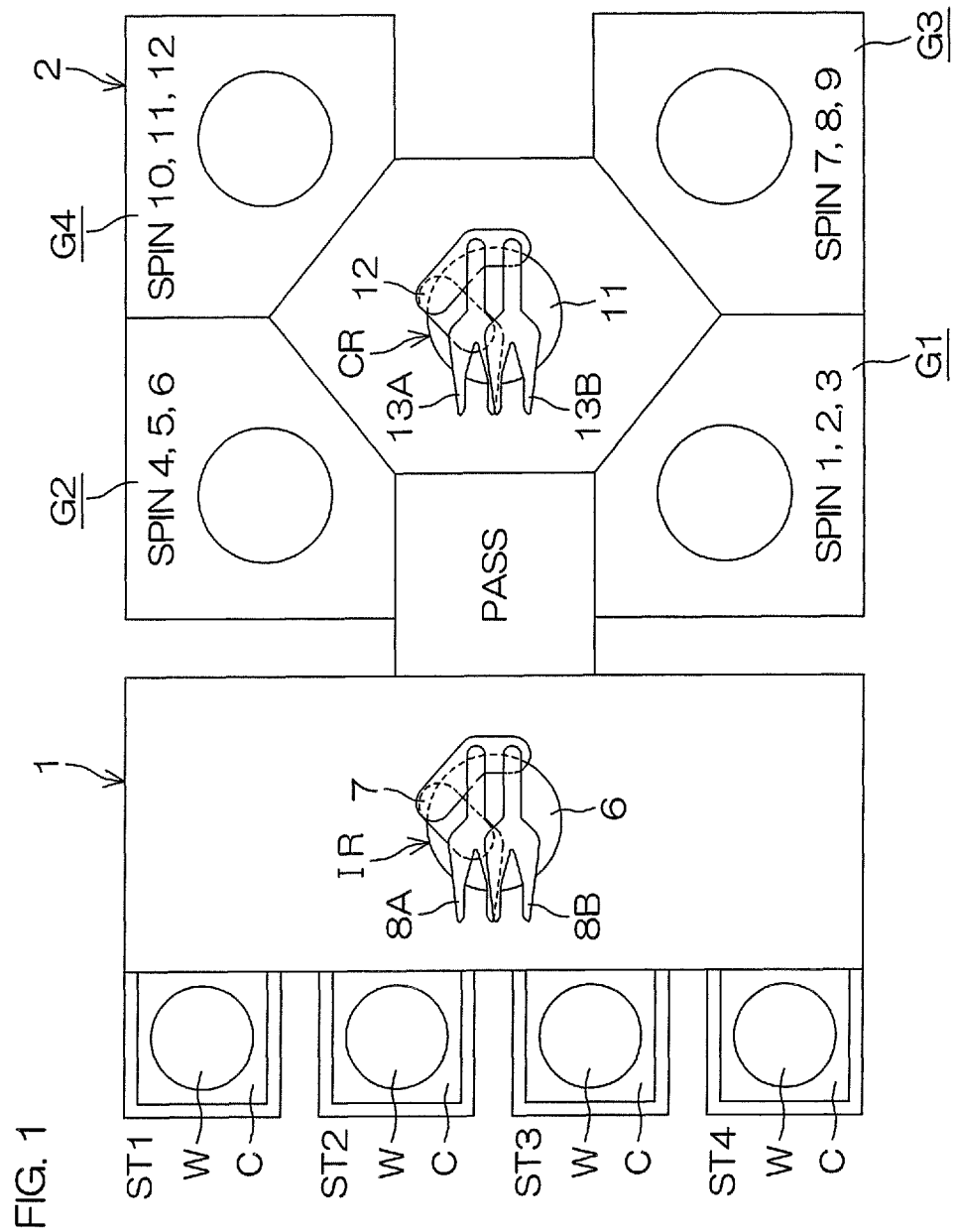
FIG. 1 is an illustrative plan view of a layout of a substrate processing apparatus according to a preferred embodiment of the present invention.
Figure 2:
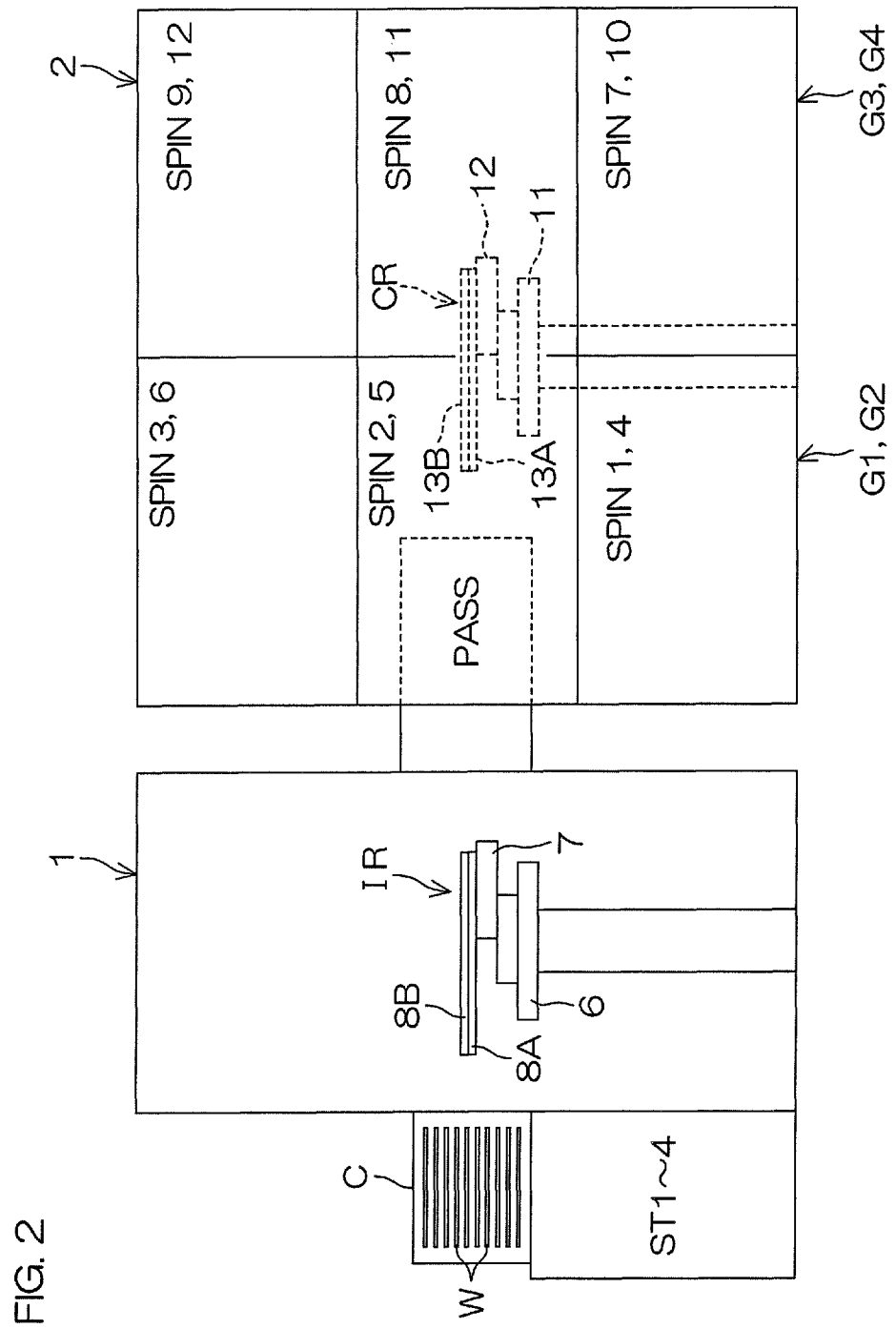
FIG. 2 is an illustrative side view of the substrate processing apparatus.
Figure 3:
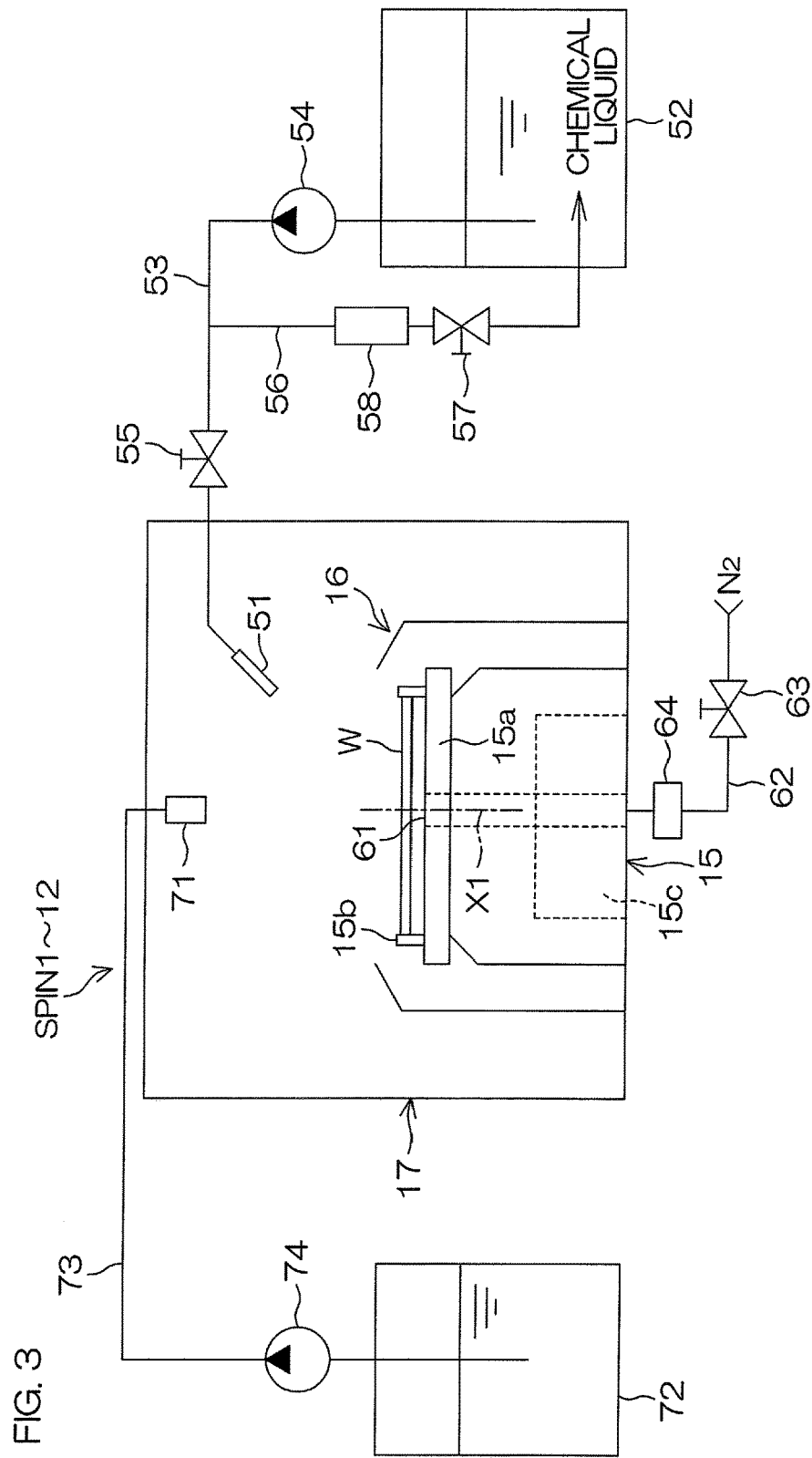
FIG. 3 is a schematic view of viewing the interior of a processing unit, included in the substrate processing apparatus, in a horizontal direction.

FIG. 1 is an illustrative plan view of a layout of a substrate processing apparatus according to a preferred embodiment of the present invention, and FIG. 2 is an illustrative side view of the same. FIG. 3 is a schematic view of viewing the interior of a processing unit, included in the substrate processing apparatus, in a horizontal direction.

As shown in FIG. 1, the substrate processing apparatus includes an indexer section 1 and a processing section 2. The processing section 2 includes a receiving/passing unit PASS for receiving and passing of a substrate W with respect to the indexer section 1.

The indexer section 1 passes an unprocessed substrate W to the receiving/passing unit PASS and receives a processed substrate W from the receiving/passing unit PASS. The receiving/passing unit PASS relays a substrate W between the indexer section 1 and the processing section 2. The processing section 2 receives the unprocessed substrate W from the receiving/passing unit PASS and performs various types of processing, such as processing using a processing agent (a processing liquid or a processing gas), processing using electromagnetic waves, such as ultraviolet rays, etc., physical cleaning process (brush cleaning, spray nozzle cleaning, etc.), etc., on the substrate W. The processing section 2 then passes the processed substrate W to the receiving/passing unit PASS. The receiving/passing unit PASS includes a supporting mechanism that supports the substrate W in a horizontal attitude. The receiving/passing unit PASS may further include an inverting mechanism that inverts the front and rear sides of the substrate W by rotating the substrate W, supported by the supporting mechanism, by 180 degrees around a horizontal axis.

As shown in FIG. 1, the indexer section 1 includes a plurality of stages ST1 to ST4 and an indexer robot IR.

As shown in FIG. 1, the plurality of stages ST1 to ST4 are aligned in a horizontal direction. As shown in FIG. 2, each of the stages ST1 to ST4 is a substrate container holding portion capable of holding a substrate container C that contains a plurality of substrates W (for example, semiconductor wafers) in a stacked state. The substrate container C may be a FOUP (front opening unified pod) that contains the substrates W in a sealed state, a SMIF (standard mechanical interface) pod, or an OC (open cassette), etc. For example, when four substrate containers C are placed respectively on the four stages ST1 to ST4, a plurality of substrates W in horizontal attitudes are stacked across intervals from each other in a vertical direction in each substrate container C.

As shown in FIG. 1 and FIG. 2, the indexer robot IR includes, for example, a base portion 6, an articulated arm 7, and a pair of hands 8A and 8B.

The base portion 6 is movable in the direction of alignment of the plurality of stages ST1 to ST4. The indexer robot IR includes a horizontal moving mechanism that moves the base portion 6 in the direction of alignment of the plurality of stages ST1 to ST4. The articulated arm 7 includes a plurality of arm portions coupled so as to be mutually rotatable along a horizontal plane and is arranged to flex and extend by change of angles between arm portions at joint portions in which two arm portions is connected to each other. A base end portion of the articulated arm 7 is coupled to the base portion 6 so as to be capable of rotating around a vertical axis. Further, the articulated arm 7 is coupled to be capable of being elevated and lowered with respect to the base portion 6. Stated another way, the base portion 6 includes an elevating/lowering drive mechanism that elevates and lowers the articulated arm 7 and a rotation drive mechanism that rotates the articulated arm 7 around the vertical axis.

Also, the articulated arm 7 includes an individual rotation drive mechanism that rotates each arm portion individually. As shown in FIG. 1, each of the hands 8A and 8B is coupled to a tip portion of the articulated arm 7 so as to be capable of rotating individually around a vertical axis and advancing and retreating individually in the horizontal direction. The articulated arm 7 includes a hand rotation drive mechanism to rotate each of the hands 8A and 8B individually around the vertical axis, and a hand advancing/retreating mechanism to advance and retract each of the hands 8A and 8B individually in the horizontal direction. Each of the hands 8A and 8B is arranged, for example, to be capable of holding a single substrate W. Although the hands 8A and 8B may be disposed in a vertically overlapped state, in FIG. 1, the hands 8A and 8B are shown to be shifted in a direction parallel to the plane of paper (horizontal direction) for clarity.

With this arrangement, the indexer robot IR operates so that the hand 8A carries out a single unprocessed substrate W from the substrate container C held by one of the stages ST1 to ST4 and passes it to the receiving/passing unit PASS. Further, the indexer robot IR operates so that the hand 8B receives a single processed substrate W from the receiving/passing unit PASS and then houses it in a substrate container C held by one of the stages ST1 to ST4.

As shown in FIG. 1 and FIG. 2, the processing section 2 includes a plurality (twelve, in the present preferred embodiment) of processing units SPIN1 to SPIN12, a main transfer robot CR, and the receiving/passing unit PASS.

As shown in FIG. 1 and FIG. 2, the processing units SPIN1 to SPIN12 are disposed three-dimensionally in the present preferred embodiment. More specifically, the plurality of processing units SPIN1 to SPIN12 are disposed so as to constitute a three-tiered structure, with four processing units being disposed at each tier. That is, the four processing units SPIN1, SPIN4, SPIN7, and SPIN10 are disposed at the first tier portion, the four processing unit SPIN2, SPIN5, SPIN8, and SPIN11 are disposed at the second tier portion, and another processing unit SPIN3, SPIN6, SPIN9 and SPIN12 are disposed at the third tier portion.

Even more specifically, as shown in FIG. 1, the main transfer robot CR is disposed at a center of the processing section 2 in a plan view, and the receiving/passing unit PASS is disposed between the main transfer robot CR and the indexer robot IR. A first processing unit group G1, in which the three processing units SPIN1 to SPIN3 are stacked, and a second processing unit group G2, in which another three processing units SPIN4 to SPIN6 are stacked, are disposed so as to face each other in a horizontal direction across the receiving/passing unit PASS. A third processing unit group G3, in which the three processing units SPIN7 to SPIN9 are stacked, is disposed as to be adjacent to the first processing unit group G1 at the side farther from the indexer robot IR. Similarly, a fourth processing unit group G4, in which the three processing units SPIN10 to SPIN12 are stacked, is disposed as to be adjacent to the second processing unit group G2 at the side farther from the indexer robot IR. The main transfer robot CR is surrounded by the first to fourth processing unit groups G1 to G4.

As shown in FIG. 1 and FIG. 2, the main transfer robot CR includes, for example, a base portion 11, an articulated arm 12, and a pair of hands 13A and 135.

As shown in FIG. 2, the base portion 11 is fixed, for example, on a frame of the substrate processing apparatus. The articulated arm 12 is arranged by a plurality of arm portions, extending along a horizontal plane, being coupled so as to be mutually rotatable, and is arranged to flex and extend by change of angles between arm portions at joint portions that are the coupling locations of the arm portions. A base end portion of the articulated arm 12 is coupled to the base portion 11 so as to be capable of rotating around a vertical axis. Further, the articulated arm 12 is coupled to be capable of being elevated and lowered with respect to the base portion 11. Stated another way, the base portion 11 includes an elevating/lowering drive mechanism that elevates and lowers the articulated arm 12 and a rotation drive mechanism that rotates the articulated arm 12 around the vertical axis.

Also, the articulated arm 12 includes an individual rotation drive mechanism that rotates each arm portion individually. Each of the hands 13A and 13B is coupled to a tip portion of the articulated arm 12 so as to be capable of rotating individually around a vertical axis and advancing and retreating individually in the horizontal direction. The articulated arm 12 includes a hand rotation drive mechanism to rotate each of the hands 13A and 13B individually around the vertical axis, and a hand advancing/retreating mechanism to advance and retract each of the hands 13A and 13B individually in the horizontal direction. Each of the hands 13A and 13B is arranged, for example, to be capable of holding a single substrate W. Although the hands 13A and 13B may be disposed in a vertically overlapped state, in FIG. 1, the hands 13A and 13B are shown to be shifted in a direction parallel to the plane of paper (horizontal direction) for clarity.

With this arrangement, the main transfer robot CR receives, by the hand 13A, a single unprocessed substrate W from the receiving/passing unit PASS and carries the unprocessed substrate W into one of the processing units SPIN1 to SPIN12. Further, the main transfer robot CR receives, by the hand 13B, a processed substrate W processed at one of the processing units SPIN1 to SPIN12 and passes the substrate W to the receiving/passing unit PASS.

Each of the processing units SPIN1 to SPIN12 is a single substrate processing type processing unit that processes the substrates W one at a time. Each of the processing units SPIN1 to SPIN12 may be liquid processing unit supplying a processing liquid to the substrate W, a gas processing unit performing processing using a processing gas, an electromagnetic wave processing unit performing processing using electromagnetic waves, such as ultraviolet rays, etc., or a physical cleaning process unit performing a physical cleaning process (brush cleaning, spray nozzle cleaning, etc.) while rotating the substrate W around a vertical axis passing through a central portion of the substrate W.

FIG. 3 shows an example where the processing units SPIN1 to SPIN12 are liquid processing units.

As shown in FIG. 3, each of the processing units SPIN1 to SPIN12 includes a box-shaped processing chamber 17 having an internal space, a spin chuck 15 holding a single substrate W in a horizontal attitude inside the processing chamber 17 and rotating the substrate W around a vertical rotational axis X1 passing through a central portion of the substrate W, and a cylindrical processing cup 16 surrounding the spin chuck 15 around the rotational axis X1 of the substrate W.

As shown in FIG. 3, the spin chuck 15 includes a disk-shaped spin base 15a held in a horizontal attitude, a plurality of chuck pins 15b projecting upward from an upper surface outer peripheral portion of the spin base 15a, a chuck opening/closing mechanism pressing the plurality of chuck pins 15b against a peripheral edge portion of the substrate W, and a spin motor 15c rotating the spin base 15b and the chuck pins 15b around the vertical rotational axis X1 to rotate the substrate W held by the plurality of chuck pins 15b. The spin chuck 15 is not restricted to the clamping type chuck shown in FIG. 3 and may be a vacuum type chuck that holds a substrate in a horizontal attitude by suction of a lower surface of the substrate onto an upper surface of a spin base.

As shown in FIG. 3, each of the processing units SPIN1 to SPIN12 includes a processing liquid nozzle 51 discharging a processing liquid toward an upper surface of the substrate W held by the spin chuck 15, a processing liquid tank 52 storing the processing liquid supplied to the processing liquid nozzle 51, a processing liquid piping 53 guiding the processing liquid inside the processing liquid tank 52 to the processing liquid nozzle 51, a liquid delivery device 54 (for example, a pump) that delivers the processing liquid inside the processing liquid tank 52 into the processing liquid piping 53, and a processing liquid valve 55 opening and closing the interior of the processing liquid piping 53. Each of the processing units SPIN1 to SPIN12 further includes a circulation piping 56 connecting the processing liquid piping 53 and the processing liquid tank 52 at an upstream side (processing liquid tank 52 side) relative to the processing liquid valve 55, a circulation valve 57 opening and closing the interior of the circulation piping 56, and a temperature adjusting device 58 adjusting the temperature of the processing liquid flowing through the circulation piping 56.

The opening and closing of the processing liquid valve 55 and the circulation valve 57 are controlled by a computer 20 to be described below. When the processing liquid inside the processing liquid tank 52 is supplied to the processing liquid nozzle 51, the processing liquid valve 55 is opened and the circulation valve 57 is closed. In this state, the processing liquid delivered to the processing liquid piping 53 from the processing liquid tank 52 by the liquid delivery device 54 is supplied to the processing liquid nozzle 51. On the other hand, when the supply of the processing liquid to the processing liquid nozzle 51 is stopped, the processing liquid valve 55 is closed and the circulation valve 57 is opened. In this state, the processing liquid delivered to the processing liquid piping 53 from the processing liquid tank 52 by the liquid delivery device 54 is returned to the processing liquid tank 52 through the circulation piping 56. Therefore during supply stoppage, in which the supply of the processing liquid to the processing liquid nozzle 51 is stopped, the processing liquid is continuously circulated in a circulation path constituted by the processing liquid tank 52, the processing liquid piping 53, and the circulation piping 56. The temperature adjusting device 58 adjusts the temperature of the processing liquid flowing inside the circulation piping 56. Therefore during the supply stoppage, the processing liquid inside the processing liquid tank 52 is heated in the circulation path and maintained at a higher temperature than room temperature.

Further, the processing liquid valve 55 is enabled to be finely adjusted in opening degree to enable a minute amount of the processing liquid to be discharged from the processing liquid nozzle 51 to perform pre-dispensing. Also, an unillustrated processing liquid recovery member is disposed near the processing liquid nozzle 51 to enable recovery of the processing liquid pre-dispensed from the processing liquid nozzle 51.

Although not shown in FIG. 3, each of the processing units SPIN1 to SPIN12 is provided with a plurality of the processing liquid nozzles 51 and the plurality of processing liquid nozzles 51 are respectively connected to different processing liquid tanks 52. A rinse liquid discharge nozzle to remove the processing liquid on the substrate W is also provided. Different processing liquids can thus be supplied selectively to the substrate W held by the spin chuck 15 of each of the processing units SPIN7 to SPIN12 and a rinse liquid can be supplied to remove the processing liquid from the substrate W.

Further, a cleaning liquid nozzle 71 is disposed at an inner wall (inner wall of the processing chamber 17) of each of the processing units SPIN1 to SPIN12. The cleaning liquid nozzle 71 is connected via a cleaning liquid piping 73 to a cleaning liquid tank 72 disposed at the exterior of the processing units SPIN1 to SPIN12 and storing pure water or other cleaning liquid. A liquid delivery device 74 interposed in the cleaning liquid piping 73 delivers the cleaning liquid from the cleaning liquid tank 72 toward the cleaning liquid nozzle 71. When the cleaning liquid nozzle 71 discharges the cleaning liquid toward a cleaning liquid jig that is being rotated by the spin chuck pins 15b or the substrate W that is being rotated by the spin chuck pins 15b, the cleaning liquid becomes scattered inside treatment chamber 1. Various parts (the chuck pins 15b and the processing cup 16) disposed inside the processing chamber 17 can be cleaned by thus scattering the cleaning liquid.

Also as shown in FIG. 3, each of the processing units SPIN1 to SPIN12 includes a gas piping 62 guiding nitrogen gas, which is an example of a gas, to a gas discharge port 61 opening at an upper surface central portion of the spin base 15a, gas valve 63 opening and closing the interior of the gas piping 62, and a heater 64 heating the nitrogen gas supplied from a gas supply source to the gas piping 62.

The turning on/off and the temperature of the heater 64 is controlled by the computer 20 to be described below. The computer 20 stops heat generation by the heater 64 when the temperature of the heater 64 reaches a set temperature that is higher than room temperature. When the temperature of the heater 64 falls below the set temperature, the computer 20 makes the heater 64 generate heat again to make the temperature of the heater 64 rise to the set temperature. The nitrogen gas supplied from the gas supply source to the gas piping 52 is heated by the heater 64 and thereafter discharged upwards from the gas discharge port 61. The nitrogen gas discharged from the gas discharge port 61 flows radially from the upper surface central portion of the spin base 15a to an upper surface outer peripheral portion of the spin base 15a in a space between the lower surface of the substrate W and the upper surface of the spin base 15a. The space between the lower surface of the substrate W and the upper surface of the spin base 15a is thereby filled with high-temperature nitrogen gas so that the entirety of the substrate W is heated uniformly by the nitrogen gas.

Figure 4:
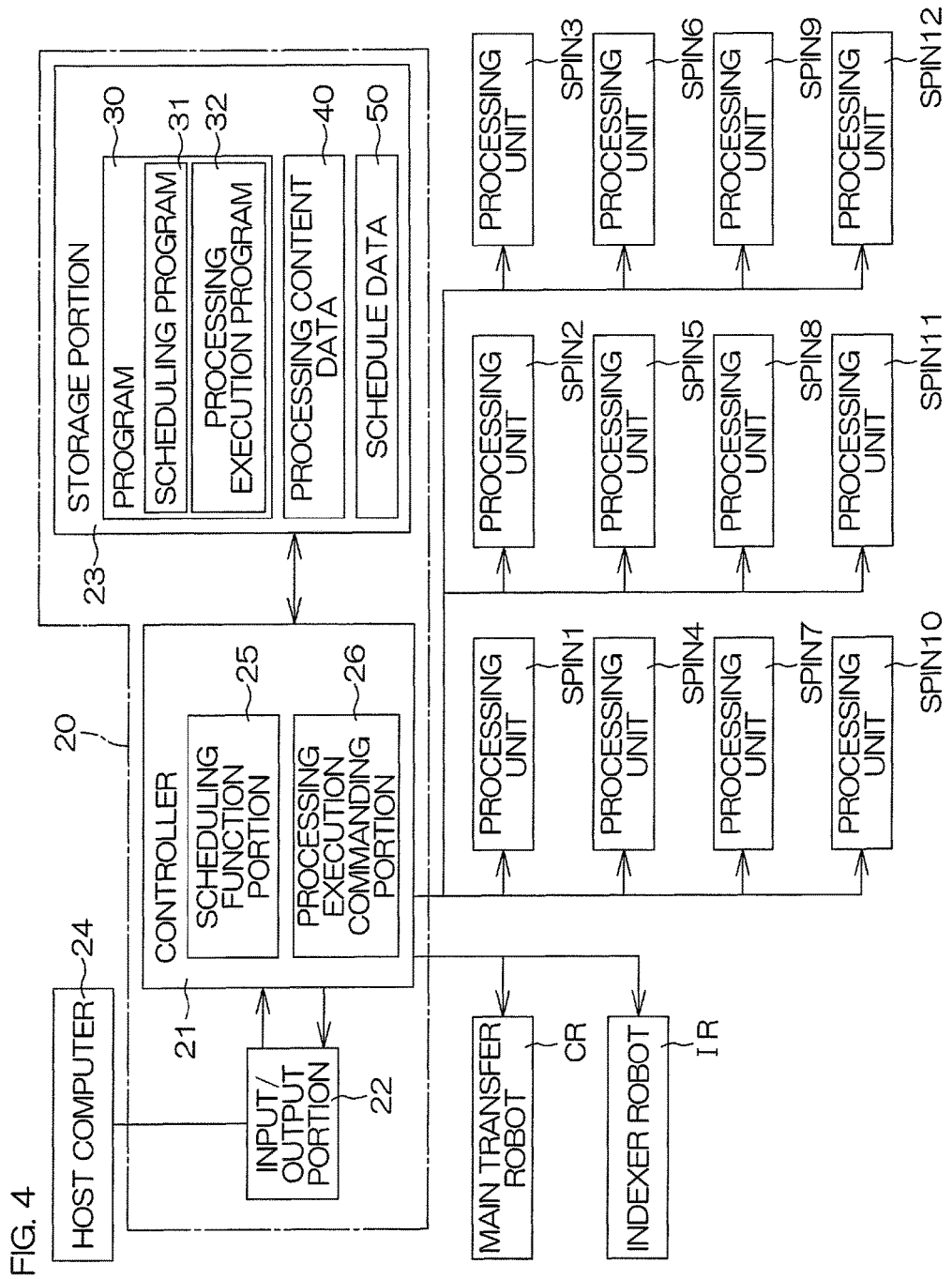
FIG. 4 is a block diagram for describing an electrical arrangement of the substrate processing apparatus.

FIG. 4 is a block diagram for describing an electrical arrangement of the substrate processing apparatus.

The substrate processing apparatus includes the computer 20 that controls the treatment units SPIN1 to SPIN12, the main transfer robot CR, and the indexer robot IR.

The computer 20 may be in the form of a personal computer (FA personal computer) and includes a controller 21, an input/output portion 22, and a storage portion 23. The controller 21 includes a calculation unit, such as a CPU, etc. The input/output portion 22 includes output equipment, such as a display unit, etc., and input equipment, such as a keyboard, a pointing device, a touch panel, etc. The input/output portion 22 further includes a communication module arranged to communicate with a host computer 24. The storage portion 23 includes a storage device, such as a solid-state memory device, a hard-disk drive, etc.

The controller 21 includes a scheduling function portion 25 and a processing execution commanding portion 26.

The scheduling function portion 25 prepares a plan (schedule) by which resources (tangible objects, such as processing units, etc., that are controlled by the controller 21) of the substrate processing apparatus are actuated in chronological order to make a substrate W be carried out from the substrate container C, be processed by any of the processing units SPIN1 to SPIN12, and thereafter be housed in the substrate container C. The processing execution commanding portion 26 actuates the resources of the substrate processing apparatus in accordance with the schedule prepared by the scheduling function portion 25.

The storage portion 23 is arranged to store various data including programs 30 executed by the controller 21, processing content data 40 received from the host computer 24 and scheduling data 50 prepared by the scheduling function portion 25, etc.

The programs 30 stored in the storage portion 23 include a scheduling program 31 that actuates the controller 21 as the scheduling function portion 25 and a processing execution program 32 that actuates the controller 21 as the processing execution commanding portion 26. The storage portion 23 is an example of a computer-readable recording medium recording a program.

The processing execution program 32 also includes methods for dealing with a case in which a device abnormality occurs during execution of post-processing and preliminary preparation. The methods will be described below.

The processing content data 40 include process job (PJ) codes assigned to respective substrates W and recipes associated with the process job codes.

A recipe is data that define substrate processing contents including a substrate processing condition and a substrate processing procedure. More specifically, a recipe includes parallel processing unit information, usable processing liquid information, processing time information, post-processing execution condition, preliminary preparation execution condition, etc.

The "parallel processing unit information" is information that designates processing units capable of executing the substrate processing included in the recipe and expresses that parallel processing by the designated processing units is possible. In other words, this information expresses that when one of the designated processing units cannot be used, substitution by another designated processing unit is possible. "Cannot be used" refers to a state where the processing unit is being used for the processing of another substrate W, a state where the processing unit is malfunctioning, a state where an operator desires not to process the substrate W by the processing unit, etc.

The "usable processing liquid information" is information related to the processing liquids (the various chemical liquids and the rinse liquid) used in the substrate processing included in the recipe.

The "processing time information" is information related to the times required for execution of the respective processes included in the recipe. Specifically, the information includes the staying time of the substrate in the designated processing unit of the recipe, the time required for execution of preliminary processing processes (preliminary preparation process and post-processing process), etc. The preliminary processing processes are processes preparing for a substrate processing process before execution of the substrate processing at a predetermined processing unit so that the substrate processing can be executed with precision and, in the present preferred embodiment, correspond to the preliminary preparation process executed before the substrate processing and the post-processing process executed after the immediately prior substrate processing.

The "post-processing execution condition" is information related to the post-processing process.

In scheduling a substrate processing block included in the recipe, the scheduling function portion 25 reads the post-processing execution condition included in the recipe to determine whether or not to position the post-processing process before the processing block and determine the specific contents of the post-processing process if it is to be positioned. Specifically, if the state of the substrate processing apparatus at the point of judgment meets the post-processing process execution condition, the block of the post-processing process including contents meeting the condition of the substrate processing apparatus is disposed in front of the applicable processing block.

The post-processing execution condition includes information related to the specific contents of the post-processing process and information related to whether or not the post-processing process is required. Whether or not the post-processing process is required and the contents of the post-processing process are defined according to each processing block included in the recipe.

A specific example of the post-processing process is a process of cleaning the interior of the processing chamber 17 of any of the processing units SPIN1 to SPIN12 (chamber cleaning process). By cleaning the interior of the processing chamber 17, it is avoided that a substrate processing performed to a prior substrate influences next substrate that is subsequently carried into the processing chamber 17. Precise substrate processing can thereby be realized and the substrate processing quality can be maintained. The post-processing process is not restricted to the cleaning process (chamber cleaning process) and may be cleaning of the chuck pins which holds the substrate (chuck pin cleaning process) or a process of cleaning other parts (for example, the processing cup 16) inside the processing chamber 17 (parts cleaning process) and may include two or more of these cleaning processes. The chamber cleaning and the parts cleaning can be executed by discharging the cleaning liquid from the cleaning liquid nozzle 71.

The post-processing execution condition includes information related to whether or not the post-processing process is required.

Whether or not the post-processing process is required is determined, for example, from at least one of the standpoints (1) to (5) below and is described in the post-processing execution condition.

(1) Relevance to the Contents of Substrate Processing

For example, a condition (rule) deeming that if substrate processing with a high possibility of contaminating the processing chamber is to be performed, the post-processing process is required regardless of whether or not substrate processing is performed subsequently may be considered.

(2) Relevance to Prior Substrate Processing

For example, a condition (rule) deeming that the post-processing process is always required when a predetermined time elapses or a predetermined number of substrates are processed without the post-processing process being executed in the same processing chamber may be considered.

(3) Relevance to the Immediately Prior Substrate Processing

For example, a condition (rule) that if there is a possibility of receiving the influence of another substrate processing performed immediately priorly in the same processing chamber, it is judged that the post-processing process must be executed after the execution of the immediately prior substrate processing may be considered. Oppositely, a condition (rule) by which it is judged that there is no need to perform the post-processing process after the immediately prior substrate processing if the immediately prior substrate processing does not impart an influence on the subsequent substrate processing, as in a case where only the same processing liquid as that used in the immediately prior substrate processing is used, etc., may be considered.

(4) Relevance to Occurrence of Abnormality 1

An abnormality related to the substrate processing apparatus itself, such as a transfer error of the substrate W, etc., or an abnormality in a device related to the substrate processing apparatus, such as an evacuation equipment that evacuates the interior of the substrate processing apparatus, etc., may occur in a period from the start of the post-processing process to before the start of the subsequent substrate processing process and the schedule may thus have to be stopped in the middle. If the post-processing process is scheduled in advance, the post-processing process is executed after the resolution of abnormality, and a condition (rule) may be set so that in this case, only a remaining process of the interrupted post-processing process is executed. Or, a condition (rule) may be set so that the entirety of the interrupted post-processing process is executed.

If the former condition is set, the performing of the same process a plurality of times can be avoided. Lowering of the operation rate of the substrate processing apparatus can thereby be suppressed or prevented.

If the latter condition is set, the substrate processing process can be started in a state where a sufficient preparation has been made to execute the substrate processing process. The substrate processing quality can thereby be stabilized.

Which of the former condition and the latter condition is to be adopted may be determined as suited in accordance with the contents of the substrate processing and contents of the post-processing process.

(5) Relevance to Occurrence of Abnormality 2

The contents of the post-processing process may be changed according to the length of time of device stoppage due to the occurrence of abnormality. As an example of a condition (rule), if the post-processing process was completed before the occurrence of abnormality, it is judged, as a rule, that repeating of the post-processing process after the restarting of the device operation is unnecessary, but if the device stoppage time continues for not less than a predetermined time, it is judged that the post-processing process is to be repeated after the device operation is restarted. By setting such a condition, it is possible to always execute the substrate processing in a clean chamber even if the effect of chamber cleaning is effective only for a fixed amount of time.

The "preliminary preparation execution condition" is information related to the preliminary preparation process.

The preliminary preparation process is a preliminary preparation operation to be executed at the processing chamber before a predetermined substrate processing is executed.

For example, as described above using FIG. 3, each of the processing units SPIN1 to SPIN12 is provided with the temperature adjusting device 58 to discharge a predetermined processing liquid at a defined temperature toward the substrate W. Although the processing liquid is required to be discharged toward the substrate W at the target temperature defined in the recipe, it takes a certain amount of time for the temperature adjusting device 58 to heat the processing liquid to the target temperature. Therefore, from before the processing liquid is supplied from the processing liquid nozzle 51 toward the substrate W, the liquid delivery device 54 may be actuated in a state where the circulation valve 57 is opened and the temperature adjusting device 58 is actuated to circulate the processing liquid inside the circulation piping 56 (Example 1 of the preliminary preparation process).

Also, if processing liquid that has fallen outside the target temperature range remains in at least one of the processing liquid nozzle 51 and the processing liquid piping 53, processing liquid of a temperature outside the target temperature may be discharged toward the substrate W. Therefore so-called pre-dispensing, by which a small amount of the processing liquid is released from the processing liquid nozzle 51 from a predetermined time before actually starting the processing liquid discharge, may be executed (Example 2 of the preliminary preparation process).

The scheduling function portion 25 positions a processing block included in the recipe in a scheduling table (storage area for scheduling) as follows. That is, the preliminary preparation execution condition included in the recipe is read, whether or not the preliminary preparation process is to be positioned before the processing block is determined, and if the preliminary preparation process is to be positioned, the specific contents of the preliminary preparation process are determined. Specifically, if it is judged that the state of the substrate processing apparatus meets the preliminary preparation execution condition at the point in time of judgment, the block of the preliminary preparation process with the matching contents is positioned before the applicable processing block.

The specific contents of the preliminary preparation process are described in the preliminary preparation execution condition. That is, such specific contents of the preliminary preparation process as what preliminary preparations (the opening of the circulation valve 57, the actuation of the temperature adjusting device 58 and the liquid delivery device 54, and the set temperature to be set at the temperature adjusting device 58 in the case of Example 1) are to be started at which timing (for example, a predetermined time before starting the substrate processing in the allocated processing unit or a predetermined time before the processing liquid is actually discharged from the processing liquid nozzle 51) are described.

Further, information related to whether or not preliminary preparation is required is also described in the preliminary preparation execution condition.

Whether or not preliminary preparation is required is determined, for example, from at least one of the standpoints (1) to (3) below and is described as the preliminary preparation execution condition in the recipe.

(1) Relevance to Substrate Processing

For example, a condition (rule) that if a processing block for executing substrate processing using a processing liquid that is high in temperature dependence is to be positioned in the scheduling table, it is judged that a preliminary preparation block for performing the pre-dispensing process as the preliminary preparation process must be positioned before the applicable processing block may be considered. Oppositely, a condition (rule) that if a processing block for executing substrate processing using a processing liquid that is low in temperature dependence is to be positioned in the scheduling table, it is judged that the pre-dispensing process is unnecessary and there is no need to position a preliminary preparation block before the applicable processing block may be considered. The contents of the preliminary preparation process and whether or not it is required are defined according to each substrate processing included in the recipe.

(2) Relevance to Prior Substrate Processing

For example, if substrate processing requiring preliminary preparation is to be executed successively, as a rule, there is no need to execute the preliminary preparation process before each of the second and subsequent substrate processing. However, a condition (rule) that even when the preliminary preparation process is executed for a prior substrate processing, if a long amount of time elapses before the subsequent substrate processing is started due to a device abnormality, etc., the preliminary preparation process is required before performing the subsequent substrate processing may be considered.

For example, in a case where the preliminary preparation process is "pre-dispensing," a temperature of a processing liquid remaining in the processing liquid nozzle 51 or the processing liquid piping 53 may have fallen outside the target temperature while the start of the subsequent substrate processing is delayed due to a device abnormality, etc. Such a problem can be avoided by setting the preliminary preparation condition described above.

(3) Relevance to Occurrence of Abnormality

An abnormality related to the substrate processing apparatus itself, such as a transfer error of the substrate W, etc., or an abnormality in a device related to the substrate processing apparatus, such as an evacuation equipment that evacuates the interior of the substrate processing apparatus, etc., may occur in a period from the start of the preliminary preparation process to before the start of the subsequent substrate processing process and execution of the schedule may thus have to be stopped in the middle. Although the preliminary preparation process is restarted after the resolution of abnormality, a condition (rule) of judging whether to execute the entirety of the preliminary preparation process that was interrupted or to execute only a process that was uncompleted when the abnormality occurred may be considered in accordance with the progress of the preliminary preparation process at the point of occurrence of abnormality in this case.

For example, if the preliminary preparation process is "pre-dispensing," if not less than 90% of the pre-dispensing was completed when the abnormality occurred, then only the remaining pre-dispensing may be executed after the resolution of abnormality. However, in this case, a condition that if less than 90% of the pre-dispensing was completed when the abnormality occurred, then the entire pre-dispensing process is performed (performed from the beginning) after the resolution of abnormality may be considered. By setting such a preliminary preparation execution condition, it is possible to perform substrate processing using the processing liquid within the target temperature while reducing the usage amount of the processing liquid for pre-dispensing.

A process job refers to one or a plurality of substrates W on which a process in common is applied. A process job code is identification information that identifies the process job (substrate group identification information). That is, the plurality of substrates W that are assigned a process job code in common are subject to a process in common in accordance with a recipe corresponding to the process job code. However, substrate processing contents (recipes) corresponding to different process job codes may also happen to be the same. For example, when a process in common is applied to a plurality of substrates W that are consecutive in processing order (order of dispensing from substrate container C), a process job code in common is assigned to the plurality of substrates W.

The controller 21 acquires the processing content data 40 for each substrate W and stores the data in the storage portion 23. The acquisition and storage of the processing content data 40 suffice to be performed before the execution of scheduling for each substrate W. For example, the processing content data 40 corresponding to the substrates W contained in substrate containers C may be provided from the host computer 24 to the controller 21 immediately after the substrate containers C are held at stages ST1 to 4.

An example of preparing a schedule for two substrates A1 and A2 that are assigned the same process job code "A" shall now be described.

In the following example, it shall be deemed that chamber cleaning is designated as the post-processing process and pre-dispensing is designated as preliminary preparation process.

Figure 5:
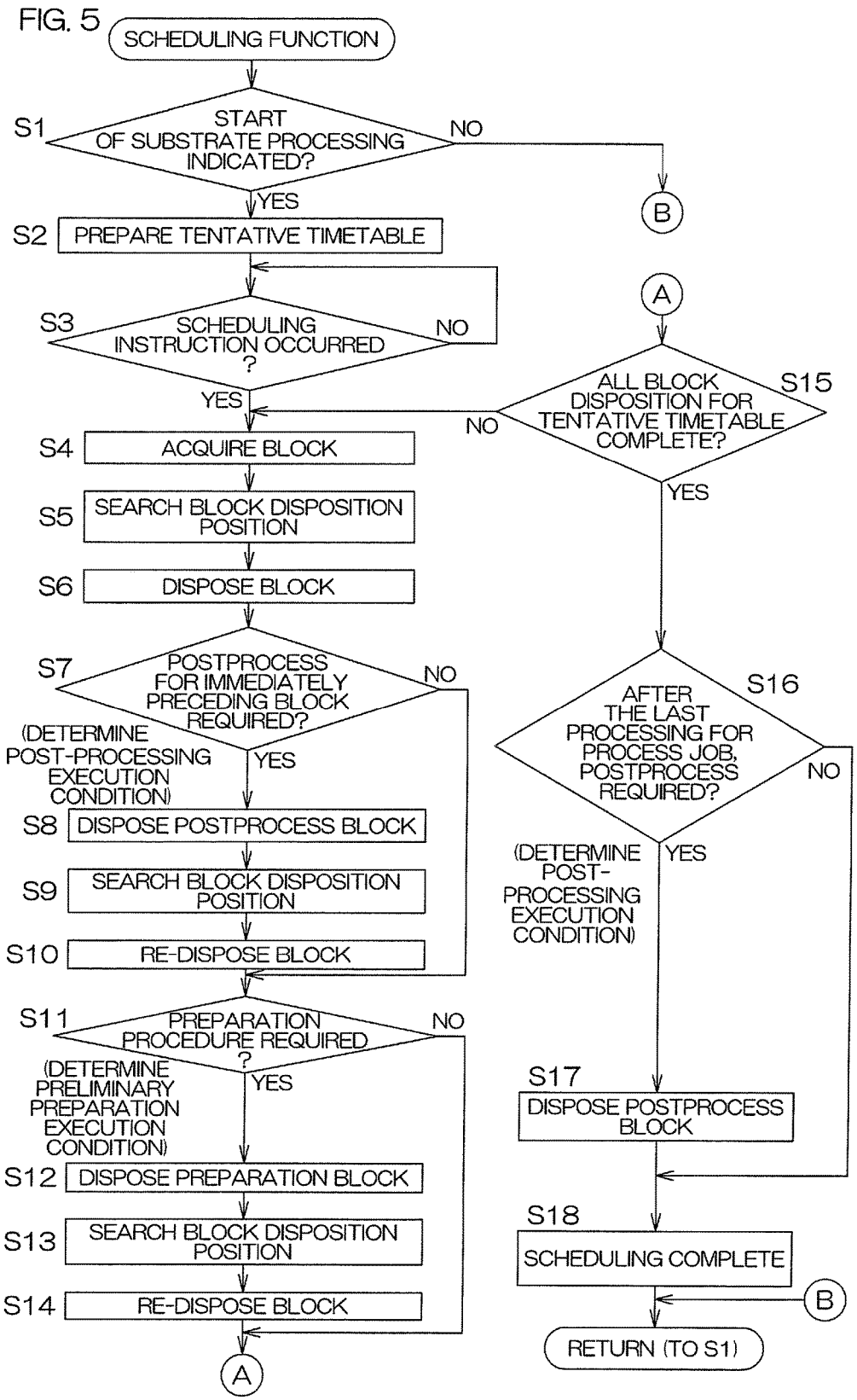
FIG. 5 is flowchart for describing a preferred embodiment of the present invention and shows an example of processing by a scheduling function portion.

FIG. 5 is flowchart for describing a first preferred embodiment of the present invention and shows an example of processing executed by the scheduling function portion 25. FIG. 5 expresses the processing performed by the controller 21 (computer 20) executing the scheduling program 31. In other words, in the present preferred embodiment, a group of steps is incorporated in the scheduling program 31 to make the computer execute the processing shown in FIG. 5.

When the host computer 24 or an operator provides a substrate processing starting command via the input/output portion 22 (step S1), the scheduling function portion 25 prepares tentative timetables for all substrates W for which the substrate processing starting command is provided (step S2). The substrate processing starting command may be issued for all substrates W contained in a common substrate container C as a unit. Or, the substrate processing starting command may command the start of processing of substrates W not less than one and less than the total number contained in the common substrate container C or may command the start of processing of a plurality of substrates W contained in separate substrate containers C.

For example, suppose that a recipe associated with a certain process job code in the processing content data 40 designates parallel processing at processing units SPIN1 to SPIN12. That is, a case where the substrate processing according to the recipe is executable at any of the twelve processing units SPIN1 to SPIN12 shall be considered. In this case, there are twelve alternative paths through which a substrate W that is assigned the process job code may pass when it is processed. That is, the paths that can be selected for the processing of the substrate W are the twelve paths each passing through one of the processing units SPIN1 to SPIN12. The scheduling function portion 25 thus prepares tentative timetables corresponding to the twelve paths.

Figure 6:
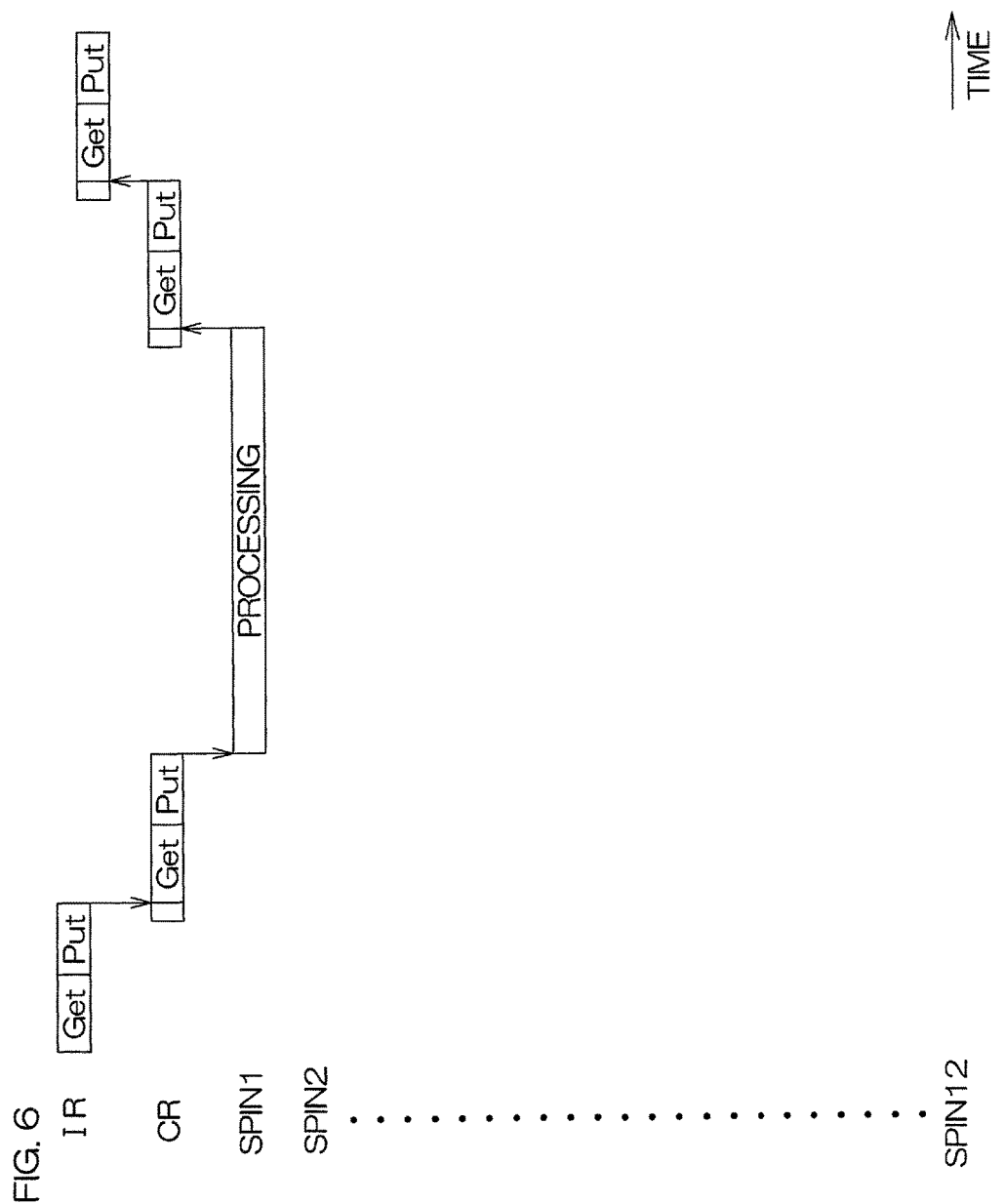
FIG. 6 shows an example of a tentative timetable.

FIG. 6 shows a tentative timetable corresponding to the path that passes through the processing unit SPIN1. The tentative timetable includes a block expressing the carrying out of the substrate W from the substrate container C by the indexer robot IR (Get), a block expressing the carrying of the substrate W into a receiving/passing unit PASS by the indexer robot IR (Put), a block expressing the carrying out of the substrate W from the receiving/passing unit PASS by the main transfer robot CR (Get), a block expressing the carrying of the substrate W into the processing unit SPIN1 by the main transfer robot CR (Put), a processing block expressing the processing of the substrate W by the processing unit SPIN1, a block expressing the carrying out of the processed substrate W from the processing unit SPIN1 by the main transfer robot CR (Get), a block expressing the carrying of the substrate W into the receiving/passing unit PASS by the main transfer robot CR (Put), a block expressing the carrying out of the substrate W from the receiving/passing unit PASS by the indexer robot IR (Get), and a block expressing the carrying of the substrate W into the substrate container C by the indexer robot IR (Put).

The scheduling function portion 25 prepares the tentative timetable by successively positioning the plurality of blocks shown in FIG. 6 so as not to overlap with each other on the time axis. For the same substrate W, the scheduling function portion 25 prepares eleven similar tentative timetables corresponding to the eleven paths respectively passing through the eleven processing units (processing units SPIN2 to SPIN12) (tentative timetables with the processing blocks set at the processing units SPIN2 to SPIN12, respectively). Tentative timetables for a total of twelve paths are thus prepared for the single substrate W.

Similar tentative timetables are prepared in correspondence to all substrates W that are assigned the same process job code. The tentative timetables thus prepared are stored in the storage portion 23 as a portion of the scheduling data 50. At the stage of preparing the tentative timetables, interference (mutual overlap on the time axis) of blocks for different substrates W is not taken into account.

When a scheduling command is generated (step S3), positioning of the blocks related to the substrate W of the process job is performed (steps S4 to S18).

Specifically, the scheduling function portion 25 references the tentative timetable corresponding to the substrate W and acquires a single block that constitutes the tentative timetable (step S4). The block acquired at this point is the block, among the yet-to-be-positioned blocks, that is positioned at the earliest position on the time axis of the tentative timetable. Further, the scheduling function portion 25 searches for a position at which the acquired block can be positioned (step S5) and positions the block at the position found by the search (step S6). Each block is positioned at the earliest position on the time axis at which a block can be positioned while avoiding overlapping use of the same resource at the same time.

The scheduling function portion 25 judges whether or not post-processing is required for a block of the same resource positioned immediately before the block positioned in step S6 (step S7). That is, the scheduling function portion 25 judges whether or not the predetermined post-processing execution condition is met.

Here, the post-processing execution condition includes that the positioned block is a processing block expressing processing at the processing unit and that the block positioned immediately before for the same resource (processing unit) is a processing block corresponding to the substrate, among the group of substrates that are assigned the process job code in common, that is processed last at the processing unit.

If the scheduling function portion 25 judges that post-processing is unnecessary (step S7: NO), it judges whether or not preliminary preparation is necessary for the block that was positioned in step S6 (step S11). That is, the scheduling function portion 25 judges whether or not the predetermined preliminary preparation execution condition is met.

If the preliminary preparation execution condition is not met (step S11: NO), the scheduling function portion 25 judges whether or not the positioning of all blocks constituting the tentative timetable has been completed (step S15) and repeats the processing from step S4 if there is a yet-to-be-positioned block.

Figure 7:
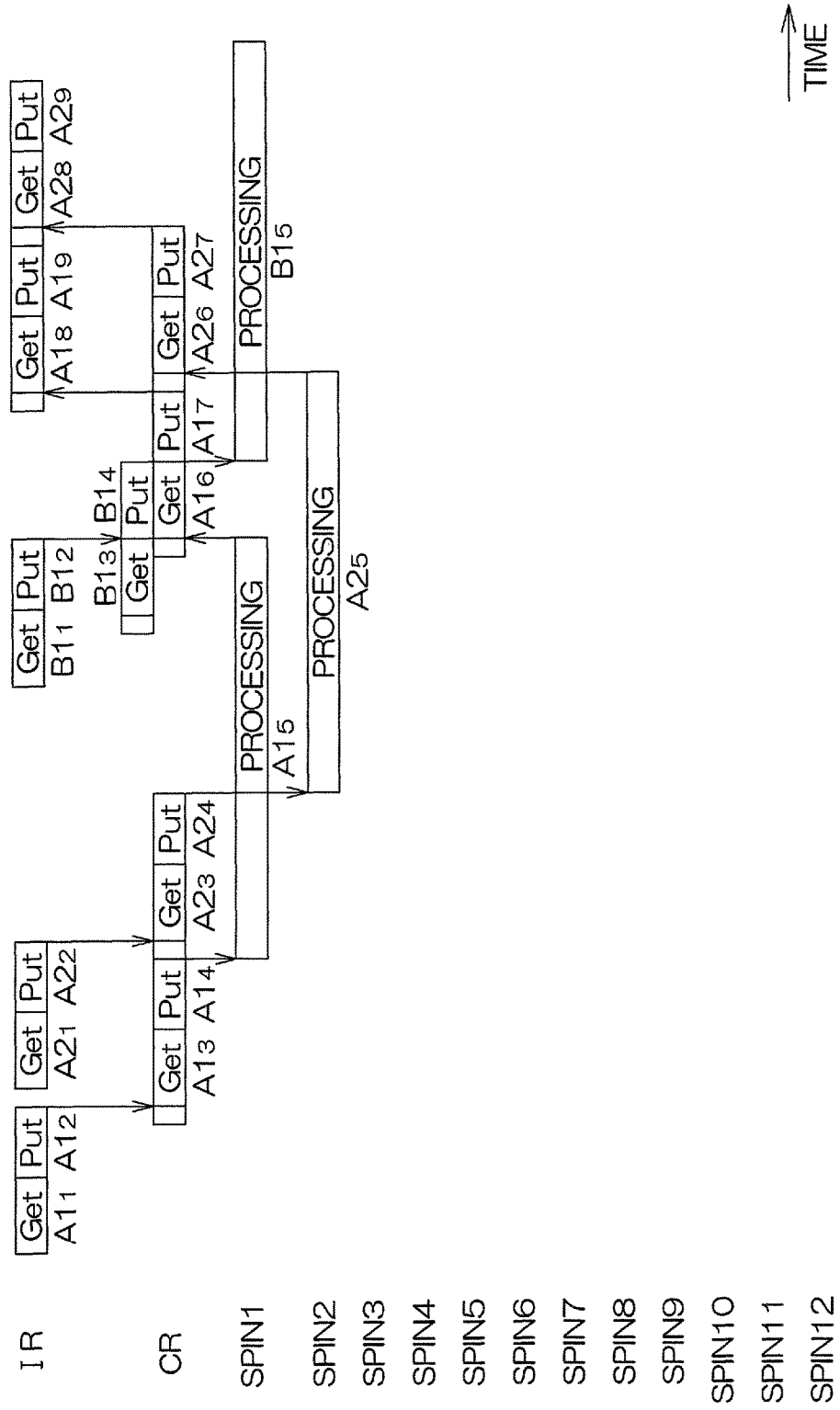
FIG. 7 shows an example of scheduling (arrangement of blocks for substrate processing; a case where neither a preliminary preparation execution condition nor a post-processing execution condition is met).

An example of scheduling in a case where neither the preliminary preparation execution condition nor the post-processing execution condition is met is shown in FIG. 7. In this example, blocks $A1_1$ to $A1_9$ are positioned in correspondence to a first substrate A1 of a process job A. The processing block $A1_5$ is positioned at the space of the processing unit SPIN1. For a second substrate A2 of the process job A, blocks $A2_1$ to $A2_4$, expressing substrate transfer operations by the indexer robot IR and the main transfer robot CR corresponding to the substrate A2, are positioned so as not to interfere with the blocks $A1_1$ to $A1_4$, expressing substrate transfer operations by the indexer robot IR and the main transfer robot CR corresponding to the first substrate A1. Further the processing block $A2_5$ corresponding to the second substrate A2 is positioned at the space of the processing unit SPIN2. A plan for parallel processing of the two substrates A1 and A2 of the process job A at the processing units SPIN1 and SPIN2 is thus formulated.

A recipe corresponding to a subsequent process job B designates, for example, parallel processing at the processing units SPIN1 and SPIN2. Respective blocks $B1_1$ to $B1_4$ corresponding to a first substrate B1 are positioned so that a processing block $B1_5$ of the first substrate B1 is positioned at the processing unit SPIN1, which among the processing units SPIN1 and SPIN2, is the earliest in the immediately prior usage ending time. In FIG. 7, the block $B1_4$ expressing the carrying of the substrate B1 into the processing unit SPIN1 by the main transfer robot CR and the block $A1_6$ expressing the carrying out of the substrate A1 from the processing unit SPIN1 by the main transfer robot CR are overlapped on the time axis. This expresses that these operations are overlapped in time because the carrying in of the substrate B1 is executed by the one hand 13A and the carrying out of the substrate A1 is executed by the other hand 13B.

FIG. 5 is referenced again. If the processing block positioned in step S6 meets the post-processing execution condition (step S7: YES), that is, the post-processing execution condition defined in the recipe is referenced to judge whether or not post-processing is required for the processing block of the same resource positioned immediately before the processing block positioned in step S6, it is judged that post-processing is required, the scheduling function portion 25 positions the post-processing block, for executing the post-processing process of the contents defined in the post-processing execution condition, immediately before the processing block positioned in step S6, that is, immediately after the immediately prior processing block (step S8). Block positioning positions are then searched (step S9) and blocks are repositioned at the found positions (step S10).

Figure 8:
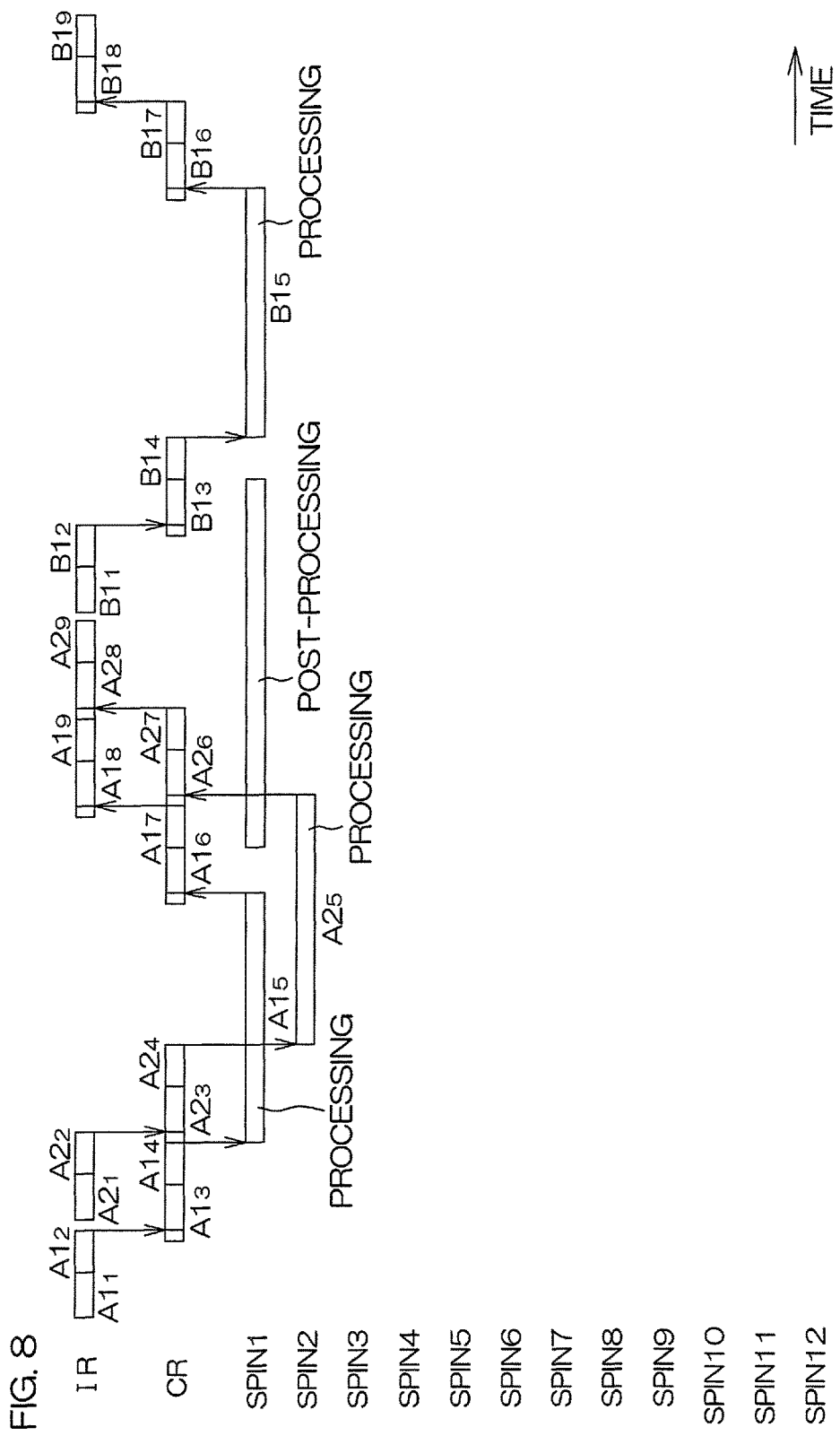
FIG. 8 shows an example of scheduling (arrangement of blocks for substrate processing; an example where a post-processing block is inserted).

Specifically, for example, suppose that the blocks $B1_1$ to $B1_5$, corresponding to the first substrate B1 of the process job B, are positioned as shown in FIG. 7. Then suppose that when the processing block $B1_5$ is positioned, it is judged that the post-processing execution condition is met and post-processing is required for the processing block $A1_5$ positioned immediately before with respect to the same resource (the processing unit SPIN1). In this case, the post-processing block is inserted between the processing blocks $A1_5$ and $B1_5$. An example where the post-processing block is inserted is shown in FIG. 8. In accordance with the insertion of the post-processing block, the processing block $B1_5$ is positioned after the post-processing block and accordingly, the blocks $B1_1$ to $B1_4$ before the processing block $B1_5$ are also shifted to later positions on the time axis. After the processing block $B1_5$ has been positioned, the remaining blocks $B1_6$ to $B1_9$ are positioned according to the position of the processing block $B1_5$.

If the processing block positioned in step S6 or step S10 meets the preliminary preparation execution condition (step S11 of FIG. 5: YES), the scheduling function portion 25 positions the preliminary preparation block, with contents defined in the preliminary preparation execution condition, immediately before the processing block (step S12). Block positioning positions are then searched (step S13) and blocks are repositioned at the found positions (step S14).

Figure 9:
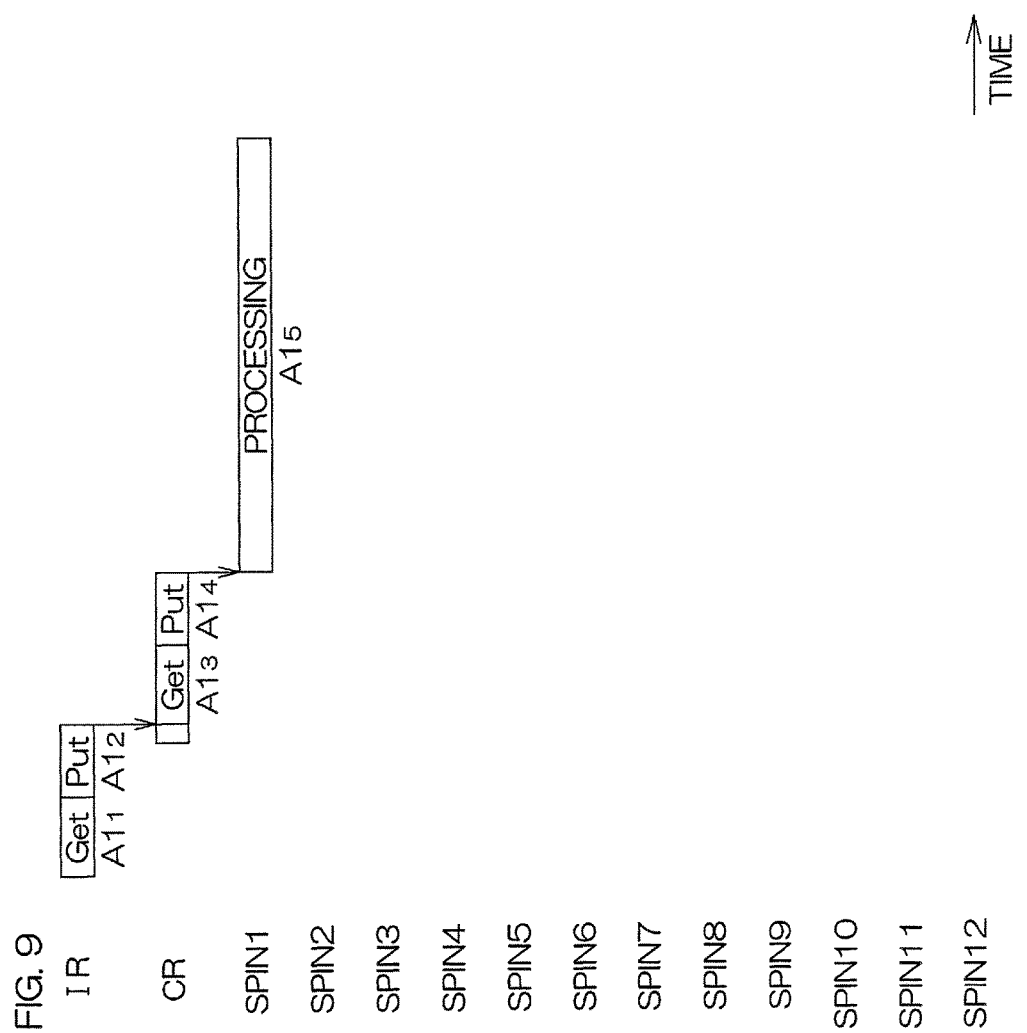
FIG. 9 shows an example of scheduling (arrangement of blocks for substrate processing).
Figure 10:
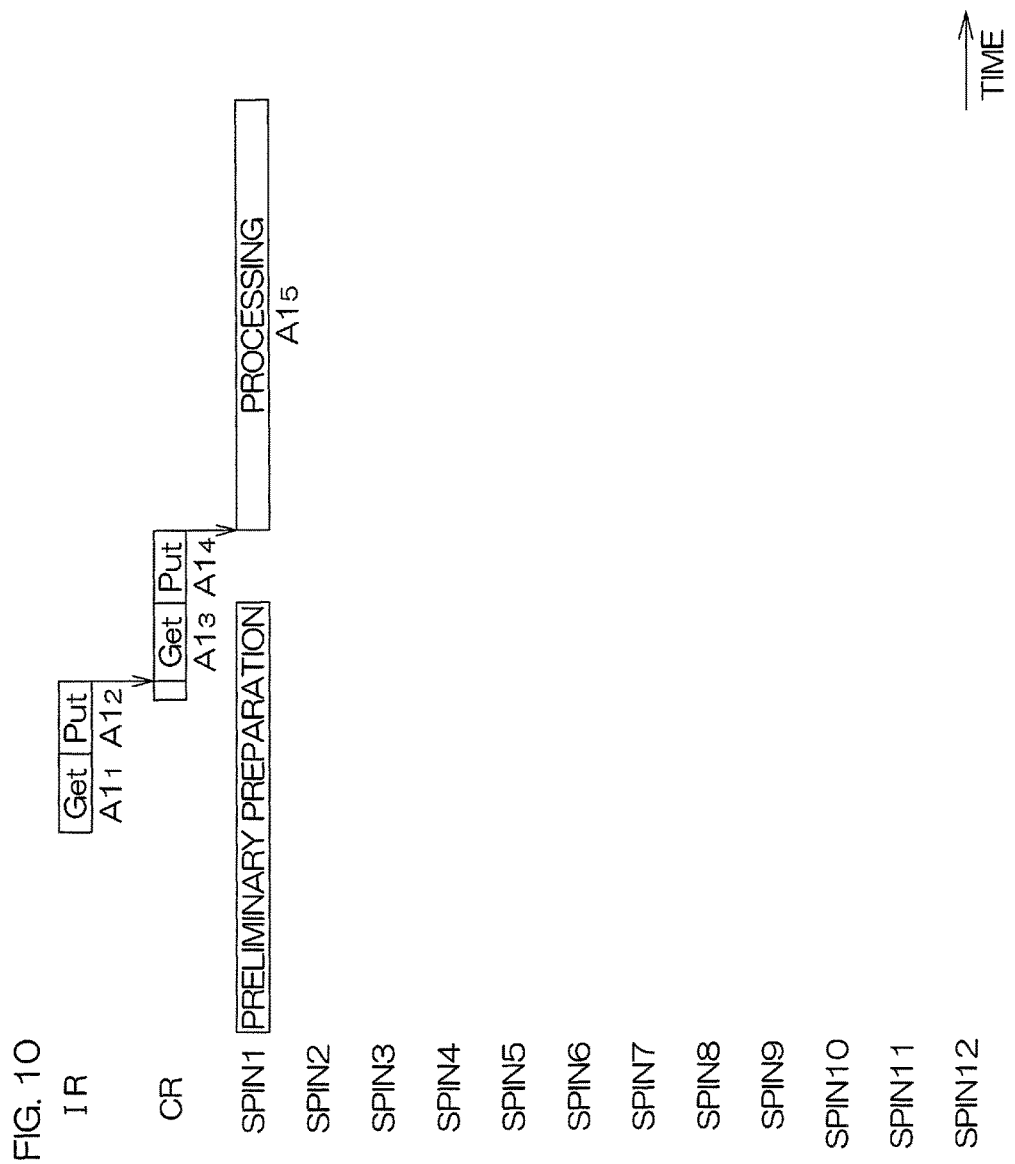
FIG. 10 shows an example of scheduling (arrangement of blocks for substrate processing; an example where a preliminary preparation block is inserted).
Figure 11:
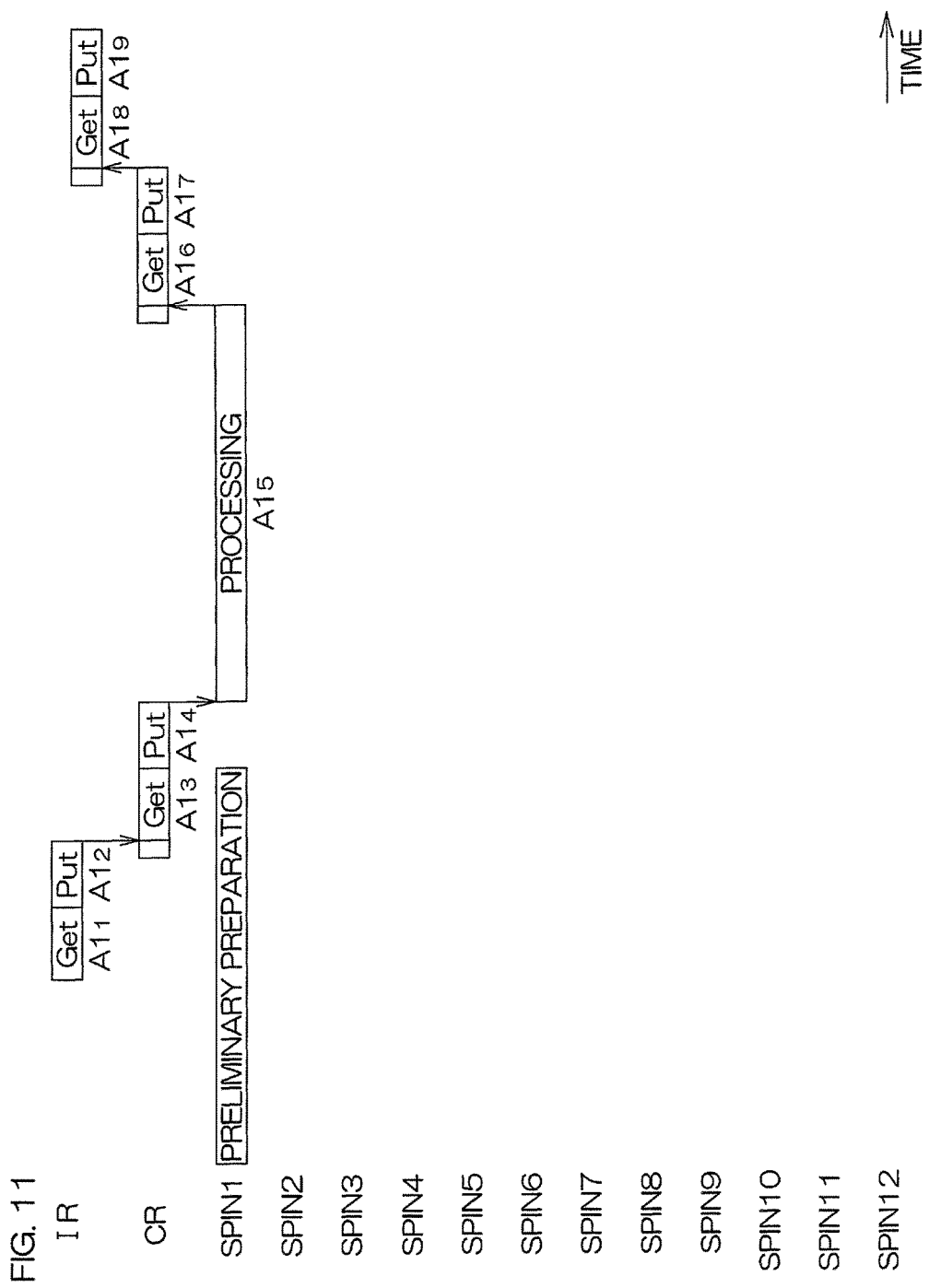
FIG. 11 shows an example of scheduling (arrangement of blocks for substrate processing).

Specifically, for example, suppose that the blocks $A1_1$ to $A1_5$, corresponding to the first substrate A1 of the process job A, are positioned as shown in FIG. 9. Then suppose that when the processing block $A1_5$ is positioned, it is judged that the preliminary preparation execution condition is met and preliminary preparation is required for the processing block $A1_5$. In this case, the preliminary preparation block is inserted immediately before the processing block $A1_5$. An example where the preliminary preparation block is inserted is shown in FIG. 10. In accordance with the insertion of the preliminary preparation block, the processing block $A1_5$ is positioned after the preliminary preparation block and accordingly, the blocks $A1_1$ to $A1_4$ are also shifted to later positions on the time axis. After the processing block $A1_5$ has been positioned, the remaining blocks $A1_6$ to $A1_9$ are positioned according to the position of the processing block $A1_5$.

Referring to FIG. 5, when the positioning of all blocks constituting the tentative timetables corresponding to all substrates that are assigned the process job code is ended (step S15: YES), the scheduling function portion 25 judges whether or not post-processing is required for the processing unit used in the process job (step S16). That is, whether or not the post-processing execution condition is met is judged. The post-processing execution condition referenced in step S16 preferably includes the reaching of a predetermined number of substrates (for example, 45 substrates) processed at the processing unit. If the post-processing execution condition is not met (step S16: NO), the scheduling for the process job is ended (step S18). If the post-processing execution condition is met (step S16: YES), a post-processing block is positioned at a space immediately after the last processing block of the processing unit used in the process job (step S17) and the scheduling for the process job is ended (step S18).

The schedule for the two substrates A1 and A2 that are assigned the same process job code "A" is thus prepared based on the processing content data 40 by the scheduling function portion 25. The processing execution commanding portion 26 executes the schedule prepared by the scheduling function portion 25 to start actuating the resources of the substrate processing apparatus. If an abnormality does not occur in the substrate processing apparatus during the execution of the schedule, the schedule is executed to the end without being stopped in the middle. One or a plurality of substrates is or are thereby processed through the planned path as planned.

Figure 12:
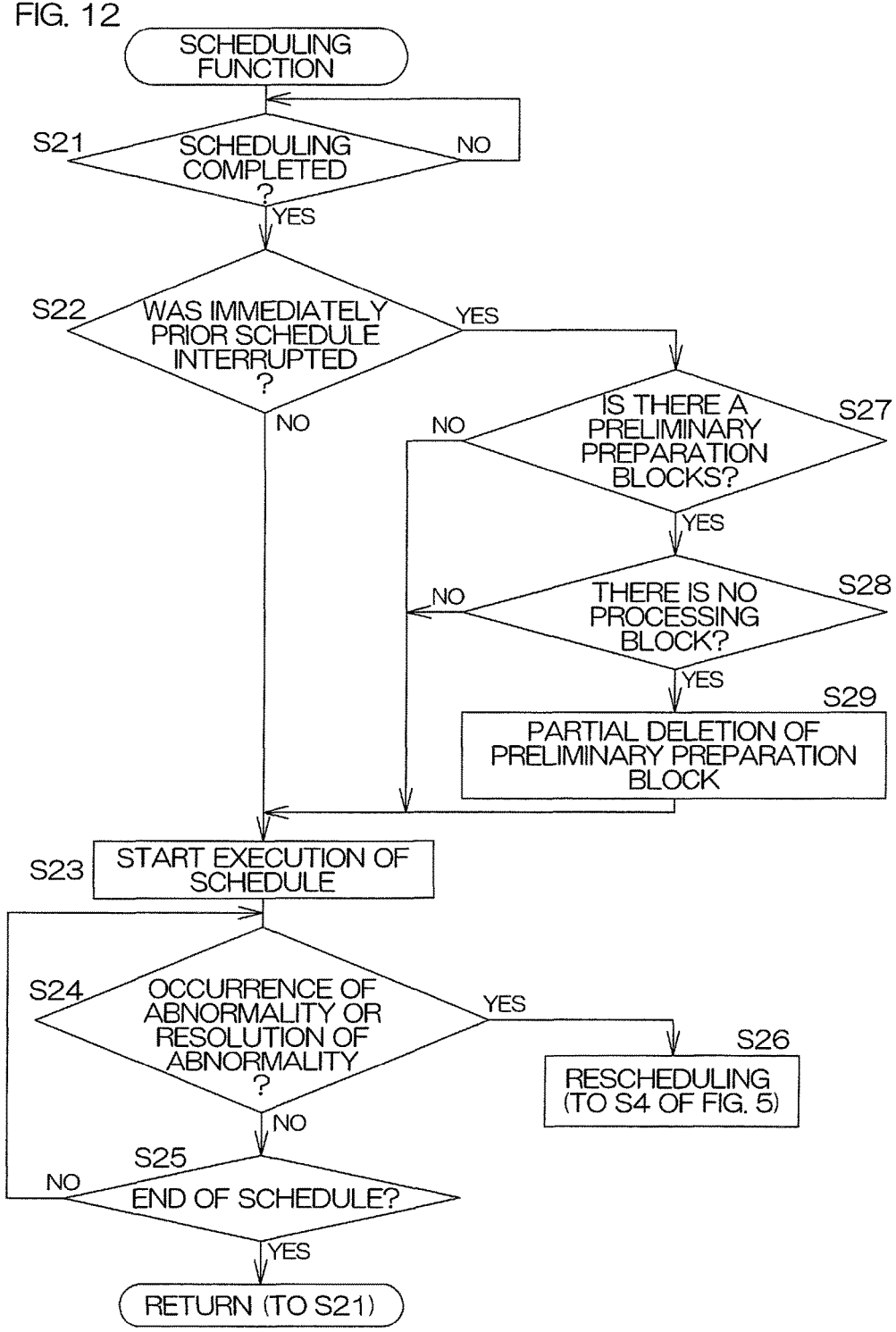
FIG. 12 is a flowchart for describing examples of change of schedule when an abnormality occurs in the substrate processing apparatus and the abnormality is resolved thereafter and shows an example of processing by a scheduling function portion.

Three examples where the scheduling function portion 25 changes a schedule, which is being executed, due to the occurrence of an abnormality in the substrate processing apparatus in a period from the start of the preliminary preparation process to before the start of the substrate processing process and changes the schedule, which is being executed, again due to resolution of the abnormality of the substrate processing apparatus shall now be described. FIG. 12 is a flowchart for describing the three examples of change of schedule. In the present preferred embodiment, a group of steps is incorporated in the scheduling program 31 and the processing execution program 32 to make the computer execute the processing shown in FIG. 12.

First Schedule Change Example

Figure 13:
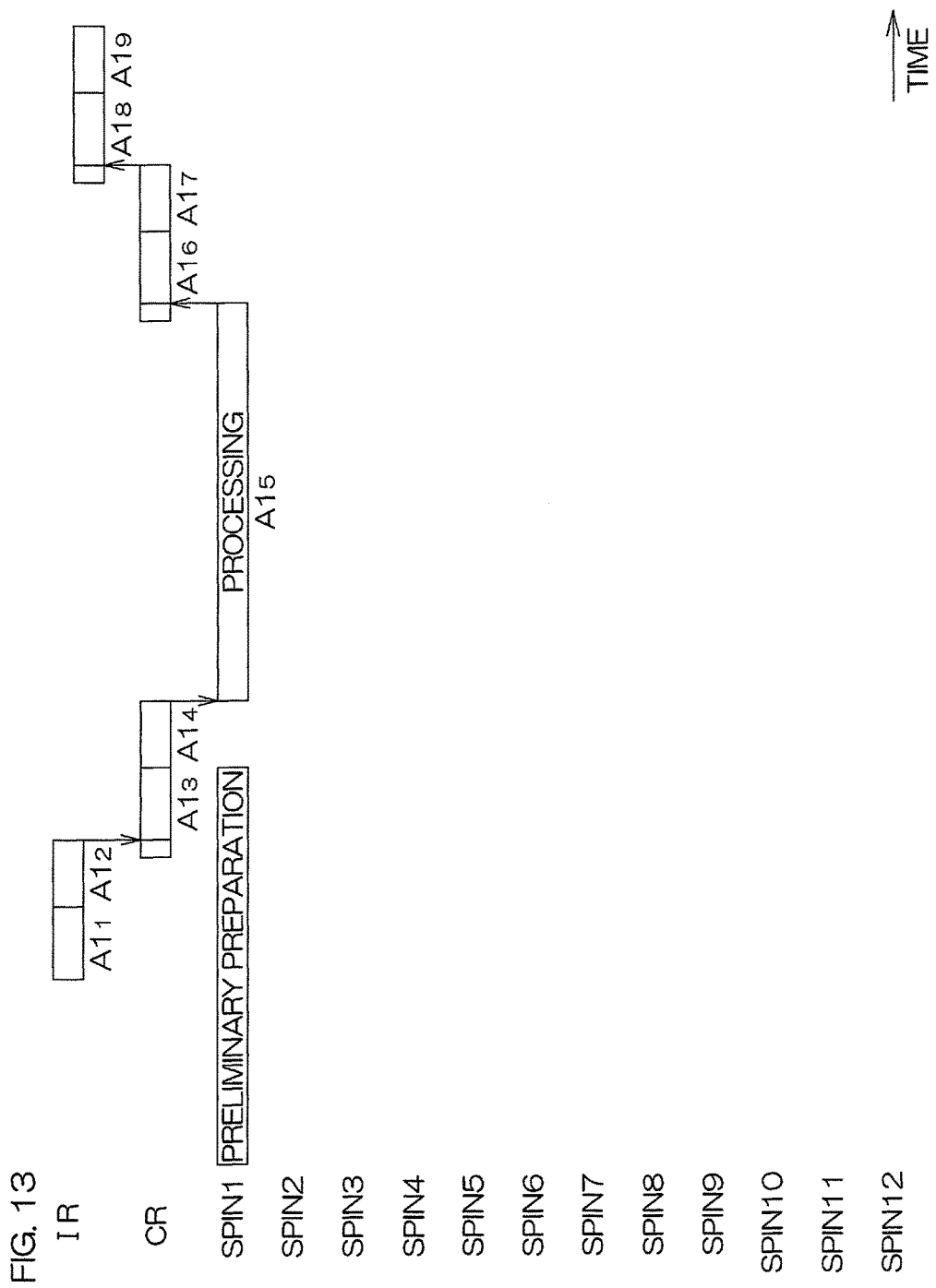
FIG. 13 is a time chart for describing a first schedule change example.

FIG. 13 is a time chart for describing an example of a schedule, prepared according to the flow shown in FIG. 5, for processing a single substrate A1 (substrate that is assigned the process job code "A"). With the present schedule change example, it shall be deemed that just the processing unit SPIN1 is designated as a useable processing unit and it is commanded that the preliminary preparation process is to be performed at the processing unit SPIN1.

As shown in FIG. 12, after the schedule for the substrate A1 is completed (step S21: YES), the scheduling function portion 25 judges, before the processing execution commanding portion 26 actuates the resources of the substrate processing apparatus according to the schedule, whether or not the execution of an immediately prior schedule was stopped in the middle due to the occurrence of an abnormality in the substrate processing apparatus (step S22). Here, it shall be deemed that the immediately prior schedule was not interrupted (step S22: NO). The processing execution commanding portion 26 thus starts the schedule shown in FIG. 13 and starts actuating the resources of the substrate processing apparatus (step S23). From the start to the end of the schedule, the controller 21 judges whether or not an abnormality has occurred in the substrate processing apparatus (step S24). If an abnormality does not occur during the execution of the schedule (step S24: NO), the schedule is executed to the end (step S25: YES). On the other hand, if an abnormality occurs during the execution of the schedule (step S24: YES), the scheduling function portion 25 changes the schedule that is being executed (step S26).

Figure 14:
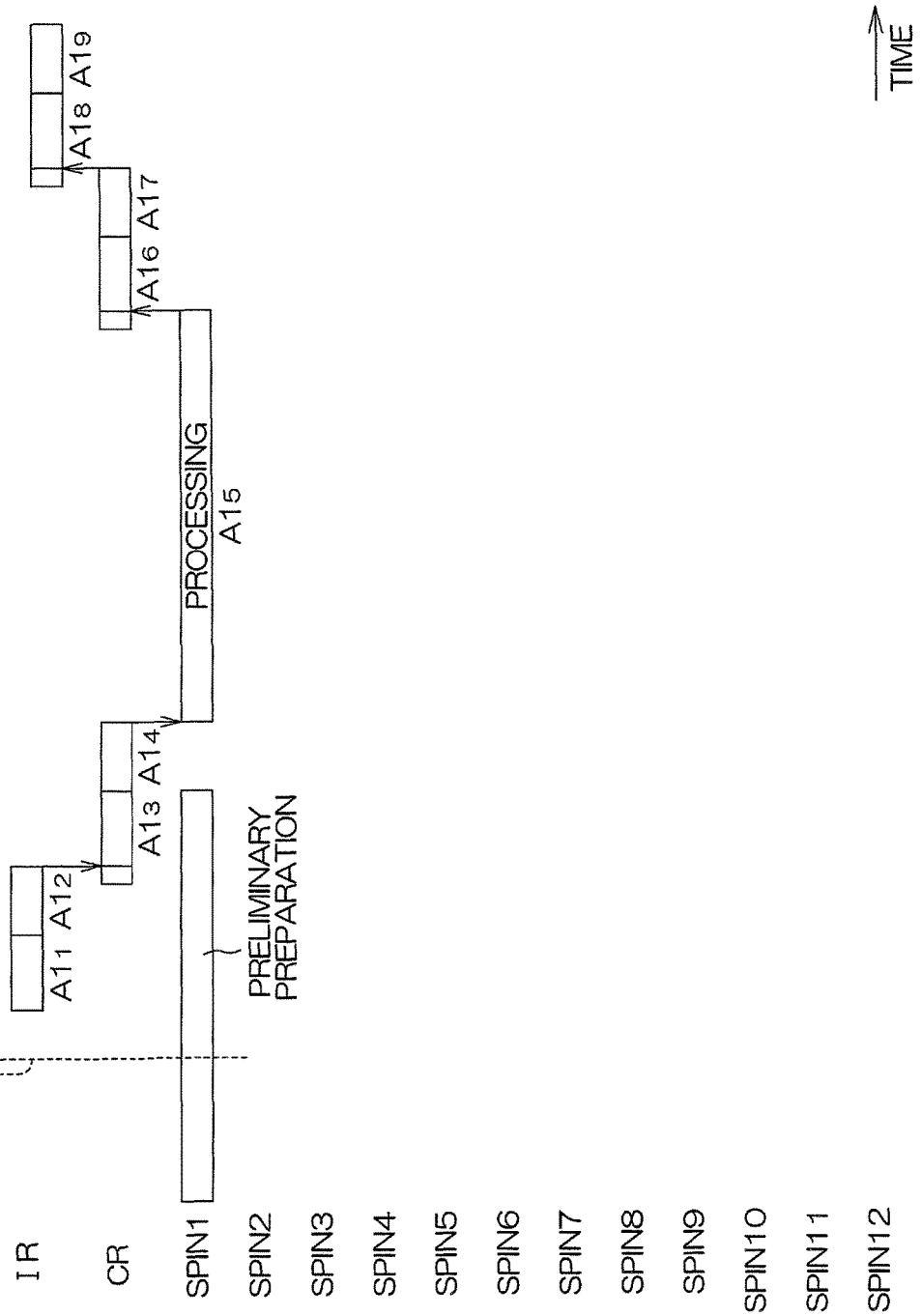
FIG. 14 is a time chart for describing the first schedule change example.
Figure 15:
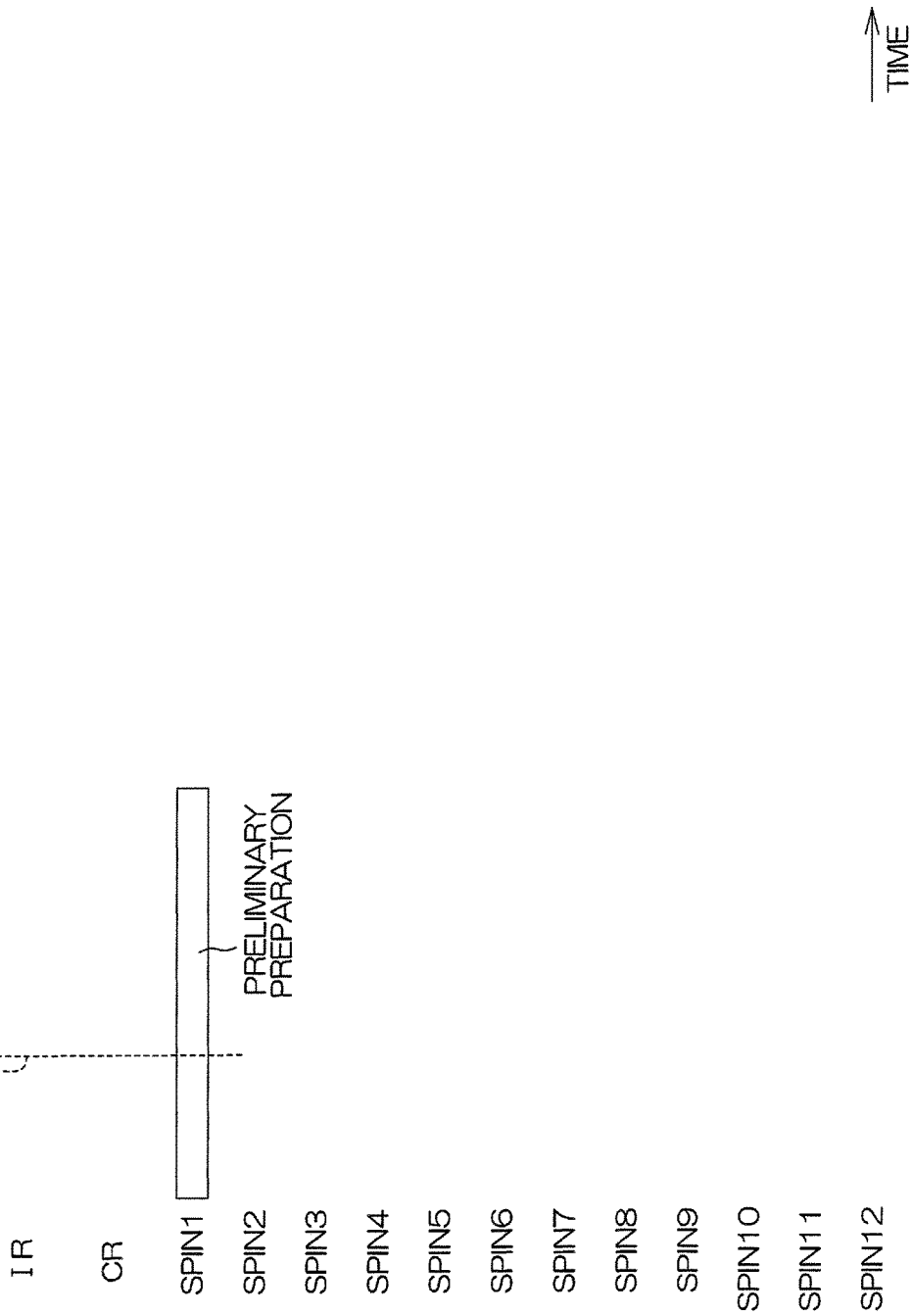
FIG. 15 is a time chart for describing the first schedule change example.

FIG. 14 shows an example where an abnormality occurs during the execution of the preliminary preparation process. More specifically, an example where an abnormality of the substrate processing apparatus occurs in a period in which the preliminary preparation process is being executed and before the substrate A1 is carried out from the substrate container C is shown. In this case, as shown in FIG. 15, the scheduling function portion 25 performs, in regard to the blocks expressing the schedule for the substrate A1, deletion of all yet-to-be-started blocks positioned later than the point of occurrence of abnormality and leaves just the block that is being executed at the point of occurrence of abnormality (in FIG. 15, the preliminary preparation block positioned in the space of the processing unit SPIN1). Specifically as shown in FIG. 14, the blocks besides the preliminary processing block have not been started before the abnormality occurred and are thus deleted from the schedule. The schedule is thereby changed and a new schedule is prepared.

As shown in FIG. 12, after the new schedule shown in FIG. 15 has been prepared (step S21: YES), the scheduling function portion 25 judges, before the processing execution commanding portion 26 actuates the resources of the substrate processing apparatus according to the schedule, whether or not the execution of an immediately prior schedule (here, the schedule shown in FIG. 13) was interrupted due to an occurrence of abnormality (step S22). Here, the execution of the immediately prior schedule was interrupted due to the occurrence of abnormality (step S22: YES) and therefore it is judged whether or not the preliminary preparation process is planned in the schedule that is scheduled to be executed (here, the schedule shown in FIG. 15) (step S27).

As shown in FIG. 15, at the processing unit SPIN1, the remaining process of the preliminary preparation process is planned to be later than the point of occurrence of abnormality and since the preliminary preparation process is thus scheduled later than the occurrence of abnormality (step S27: YES), the scheduling function portion 25 judges whether or not processing of the substrate is planned to be later than the preliminary preparation process, that is, whether or not a processing block is positioned after the preliminary preparation block for the same resource (here, the processing unit SPIN1) (step S28).

Figure 16:
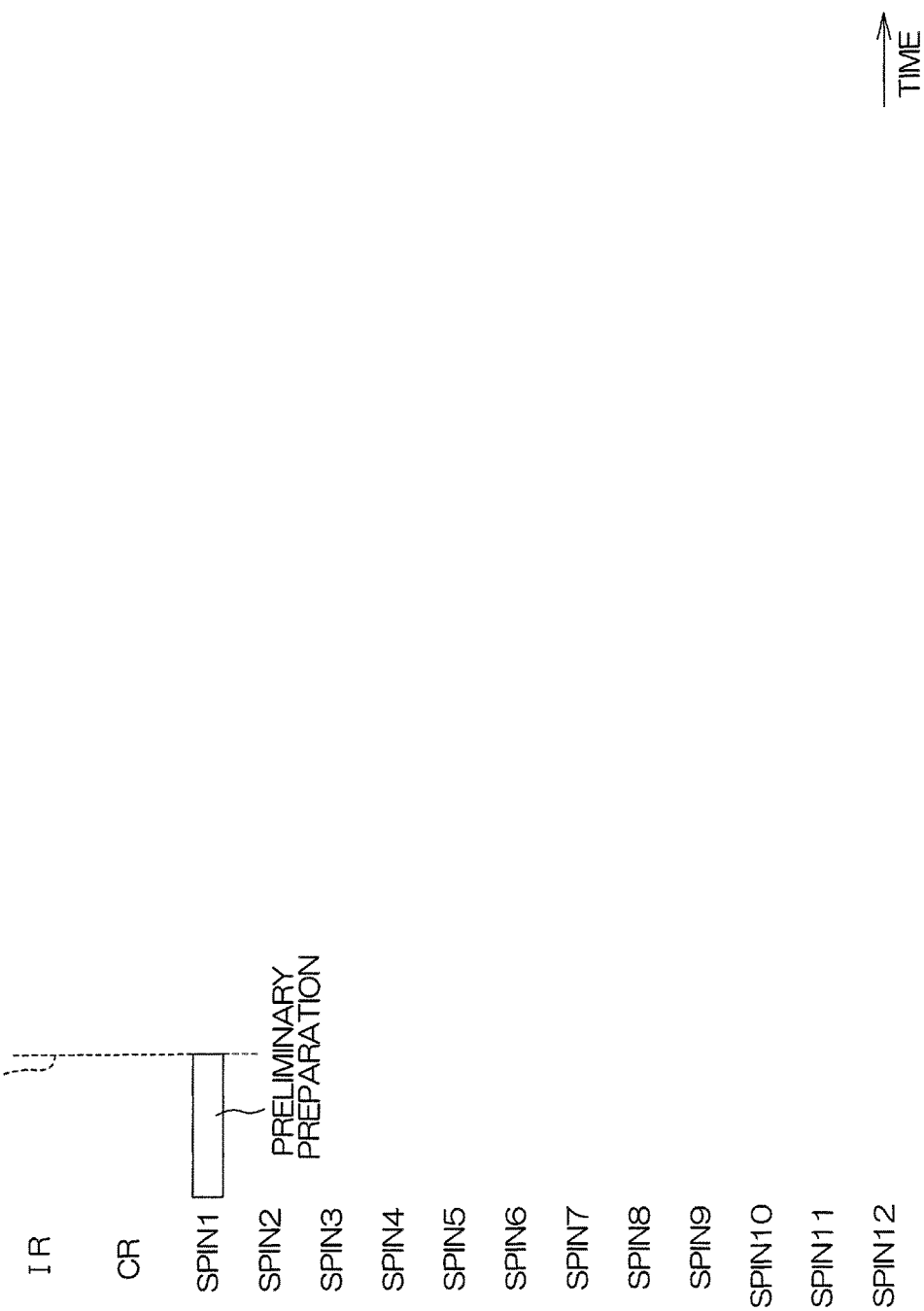
FIG. 16 is a time chart for describing the first schedule change example.

As shown in FIG. 15, with the present schedule, a processing block is not positioned after the preliminary preparation block (step S28: YES) and therefore the scheduling function portion 25 deletes the portion of the preliminary preparation block positioned later than the point of occurrence of abnormality as shown in FIG. 16 and interrupts the preliminary preparation process (step S29). The scheduling function portion 25 then stores or makes the storage portion 23 store the fact that the preliminary preparation process was interrupted together with the contents of the interrupted preliminary preparation process. Thereafter, the schedule shown in FIG. 16 is executed by the processing execution commanding portion 26 (step S23). That is, with the schedule shown in FIG. 16, all blocks positioned later than the point of occurrence of abnormality are deleted and therefore the processing execution commanding portion 26 does not make any of the resources operate.

Although with the arrangement described above, in the preliminary preparation block, the portion positioned later than the point of occurrence of abnormality is deleted and the preliminary preparation process is interrupted (S29), the preliminary preparation process does not have to be interrupted necessarily. For example, if, when the preliminary preparation process is the pre-dispensing process, the pre-dispensing of substantially the predetermined amount of processing liquid has been completed, there is no merit in interrupting the pre-dispensing and it may thus be possible not to interrupt the pre-dispensing.

As shown in FIG. 12, the scheduling function portion 25 judges whether or not the abnormality is resolved by a predetermined time (for example, by the scheduled end time of the schedule before change shown in FIG. 13) (step S24). If the abnormality of the substrate processing apparatus is eliminated by the predetermined time (step S24: YES), the scheduling function portion 25 changes the schedule that is being executed (the schedule shown in FIG. 16) and prepares a new schedule (step S26).

Specifically, the scheduling function portion 25 positions all blocks, which, in the schedule interrupted by the occurrence of abnormality (here, the schedule shown in FIG. 14), have not been started at the point of occurrence of abnormality. In the schedule shown in FIG. 14, the abnormality of the substrate processing apparatus occurred before the blocks besides the preliminary preparation block was started and therefore all blocks besides the preliminary preparation block are positioned on the schedule (see FIG. 17 and FIG. 18).

Figure 17:
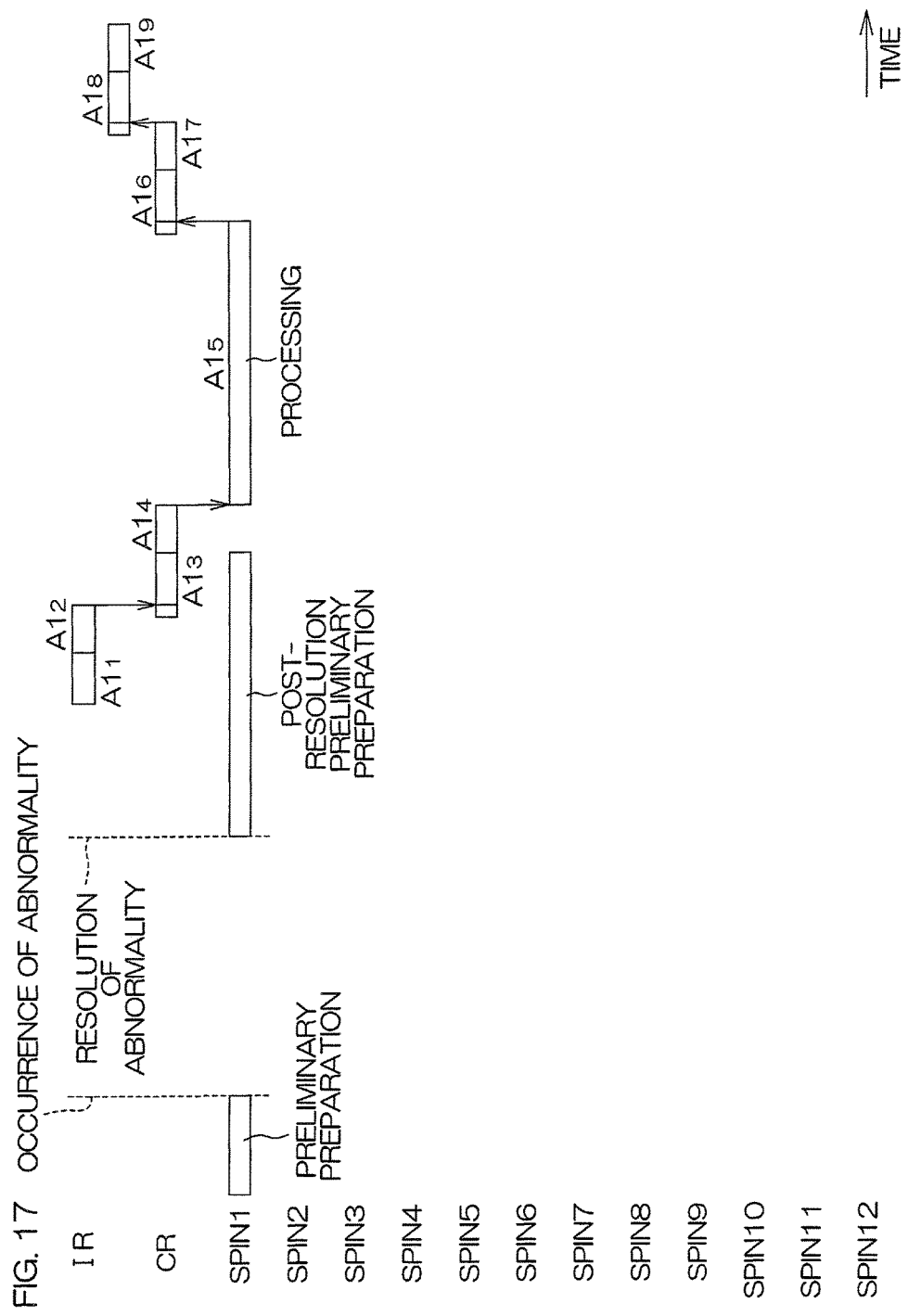
FIG. 17 is a time chart for describing the first schedule change example.

The preliminary preparation process, by which processing was started at the point of occurrence of abnormality, is positioned based on the preliminary preparation execution condition described in the recipe. That is, as shown in FIG. 17, the preliminary preparation block is positioned as the post-resolution preliminary preparation block so that reset is performed and the preliminary preparation process is started from the beginning. Or, as shown in FIG. 18, planning is performed so that only the portion of the preliminary preparation block, the execution of which was interrupted due to the occurrence of abnormality, is positioned as the post-resolution preliminary preparation block and the preliminary preparation process is restarted.

That is, when the abnormality of the substrate processing apparatus is resolved, whether or not the preliminary preparation process was interrupted in the schedule being executed when the abnormality occurred (the schedule shown in FIG. 14) is added to the preliminary preparation execution condition. If the preliminary preparation process was interrupted, scheduling is performed so that the preliminary preparation process is performed from the beginning or from the middle (step S14). The schedule is thus changed and a new schedule is prepared according to the resolution of abnormality.

Figure 18:
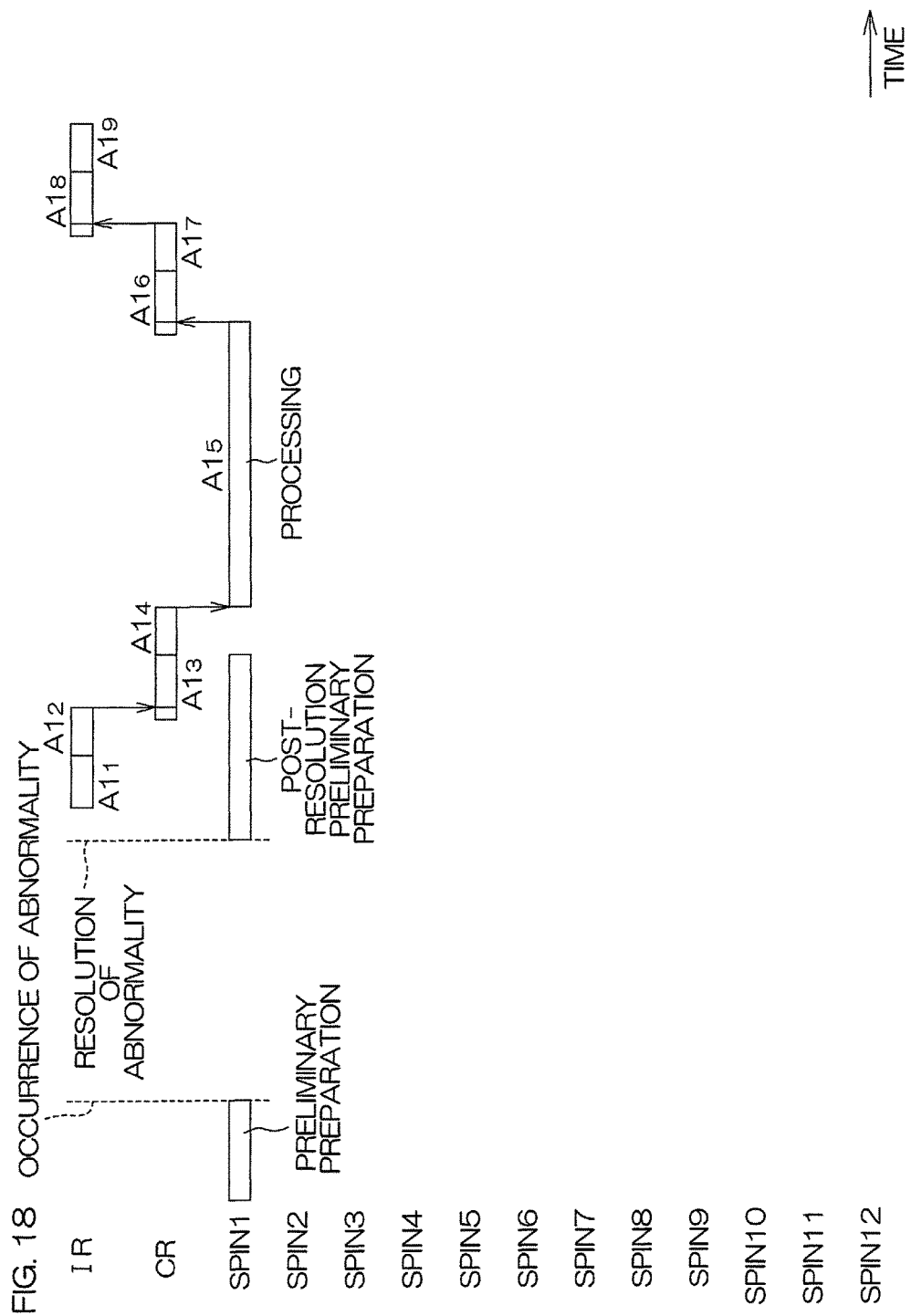
FIG. 18 is a time chart for describing the first schedule change example.

As shown in FIG. 12, after the new schedule shown in FIG. 17 or FIG. 18 has been prepared (step S21: YES), the scheduling function portion 25 judges, before the processing execution commanding portion 26 actuates the resources of the substrate processing apparatus according to the schedule, whether or not the execution of an immediately prior schedule (here, the schedule shown in FIG. 16) was interrupted due to an occurrence of abnormality (step S22). Here, the execution of the immediately prior schedule was not interrupted due to an occurrence of abnormality (step S22: NO) and the processing execution commanding portion 26 thus starts actuating the resources of the substrate processing apparatus in accordance with the schedule shown in FIG. 17 or FIG. 18 (step S23). From the start to the end of the schedule, the controller 21 judges whether or not an abnormality has occurred in the substrate processing apparatus (step S24). If an abnormality does not occur in the substrate processing apparatus, the schedule is executed to the end without being stopped in the middle. The substrate A1 is thereby processed through the planned path as planned.

Second Schedule Change Example

Figure 19:
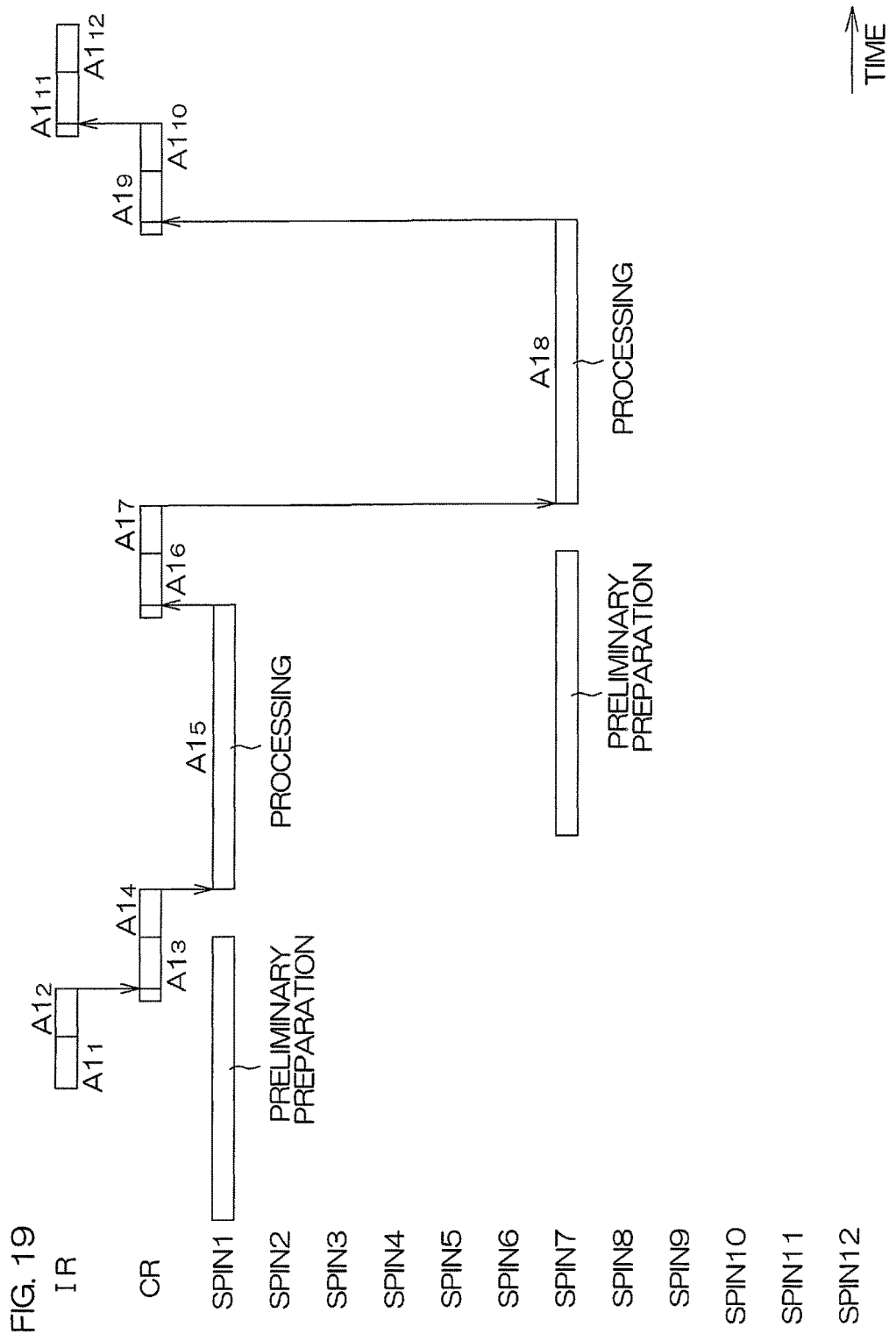
FIG. 19 is a time chart for describing a second schedule change example.

FIG. 19 is a time chart for describing an example of a schedule, prepared according to the flow shown in FIG. 5, for processing a single substrate A1. In the present schedule change example, the recipe corresponding to the process job A commands that the substrate A1 is to be processed successively by two processing units. Specifically, just the processing unit SPIN1 is designated as a first processing unit that executes a first substrate processing process on the substrate A1 and just the processing unit SPIN7 is designated as a second processing unit that executes a second substrate processing process on the substrate A1. The substrate A1 processed at the processing unit SPIN1 is planned to be transferred from the processing unit SPIN1 to the processing unit SPIN7 by the main transfer robot CR (see blocks $A1_6$ to $A1_7$). Further, the preliminary preparation process is planned to be executed at each of the processing units SPIN1 and SPIN7 before the substrate processing process is started at each of the processing units SPIN1 and SPIN7.

The first substrate processing process and the second substrate processing process may be processes of performing the same type of processing on the substrate or may be processes of performing processing of different types. Or, the position of the substrate at which the processing is performed may differ between the first substrate processing process and the second substrate processing process. For example, the first substrate processing process may be a process of processing a rear surface of the substrate at the side opposite to a front surface on which a device is formed and the second substrate processing process may be a process of processing the front surface of the substrate, which is the device formation surface. In this case, inversion of the substrate may be performed by the receiving/passing unit PASS or an inversion mechanism inverting the front and rear sides of the substrate W may be included in the main transfer robot CR.

Figure 20:
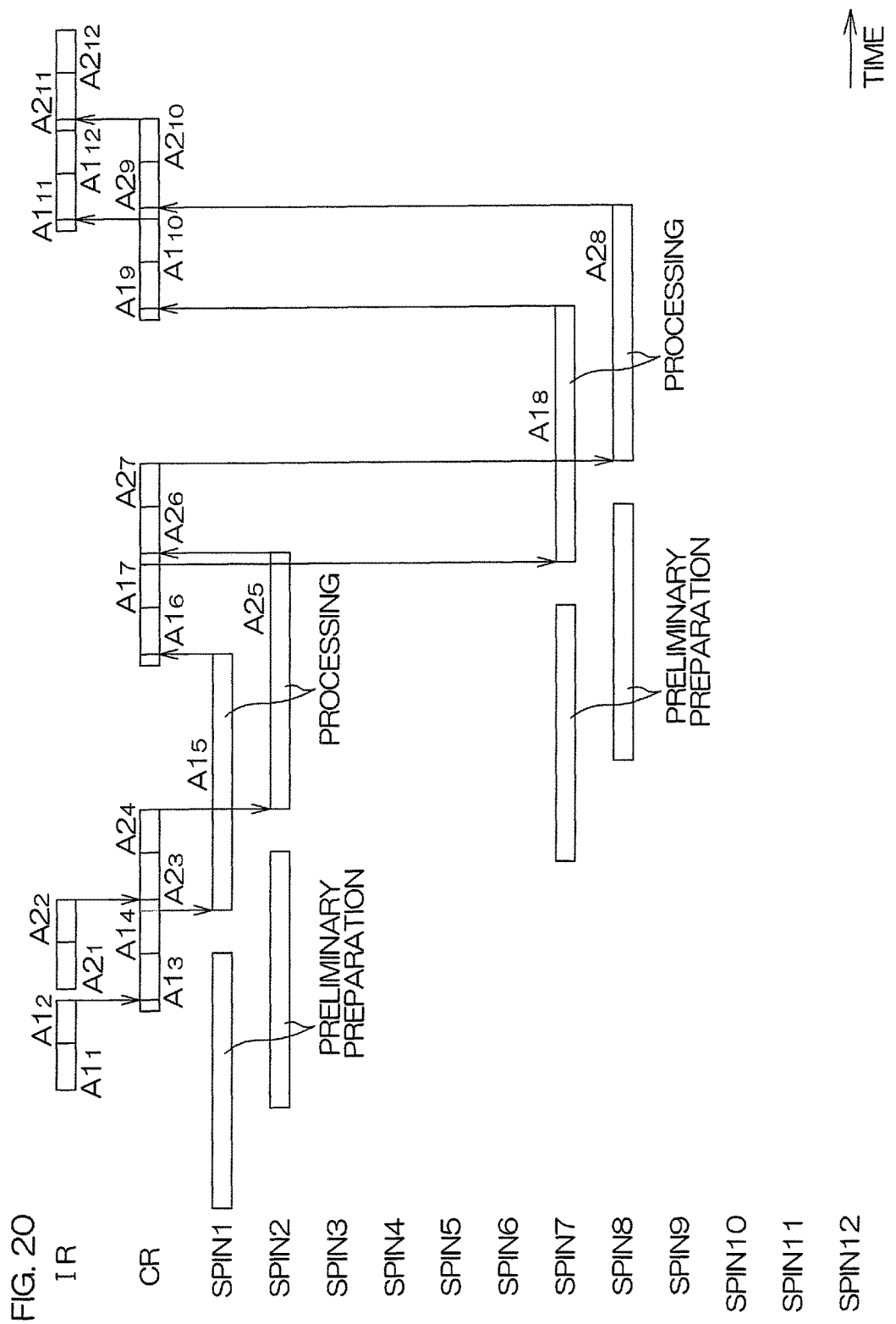
FIG. 20 is a time chart for describing the second schedule change example.

FIG. 20 is a time chart for describing an example of schedules, prepared according to the flow shown in FIG. 5, for processing two substrates A1 and A2 (two substrates that are assigned the same process job code "A"). In the present schedule change example, the recipe corresponding to the process job A designates just the processing unit SPIN2 as the first processing unit that executes the first substrate processing process on the substrate A2 and designates just the processing unit SPIN8 as the second processing unit that executes the second substrate processing process on the substrate A2. That is, with the recipe corresponding to the process job A, the processing units SPIN1 and SPIN2 are designated as parallel processing units for the first substrate processing process and the processing units SPIN7 and SPIN8 are designated as parallel processing units for the second substrate processing process.

As shown in FIG. 12, after the schedules for the substrates A1 and A2 are completed (step S21: YES), the scheduling function portion 25 judges, before the processing execution commanding portion 26 actuates the resources of the substrate processing apparatus according to the schedules, whether or not the execution of an immediately prior schedule was stopped in the middle due to the occurrence of an abnormality in the substrate processing apparatus (step S22). Here, it shall be deemed that the immediately prior schedule was not interrupted (step S22: NO). The processing execution commanding portion 26 thus starts the execution of the schedules shown in FIG. 20 and starts actuating the resources of the substrate processing apparatus (step S23). From the start to the end of the schedules, the controller 21 judges whether or not an abnormality has occurred in the substrate processing apparatus (step S24). If an abnormality does not occur during the execution of the schedules (step S24: NO), the schedules are executed to the end (step S25: YES). On the other hand, if an abnormality occurs during the execution of a schedule (step S24: YES), the scheduling function portion 25 changes the schedule that is being executed (step S26).

Figure 21:
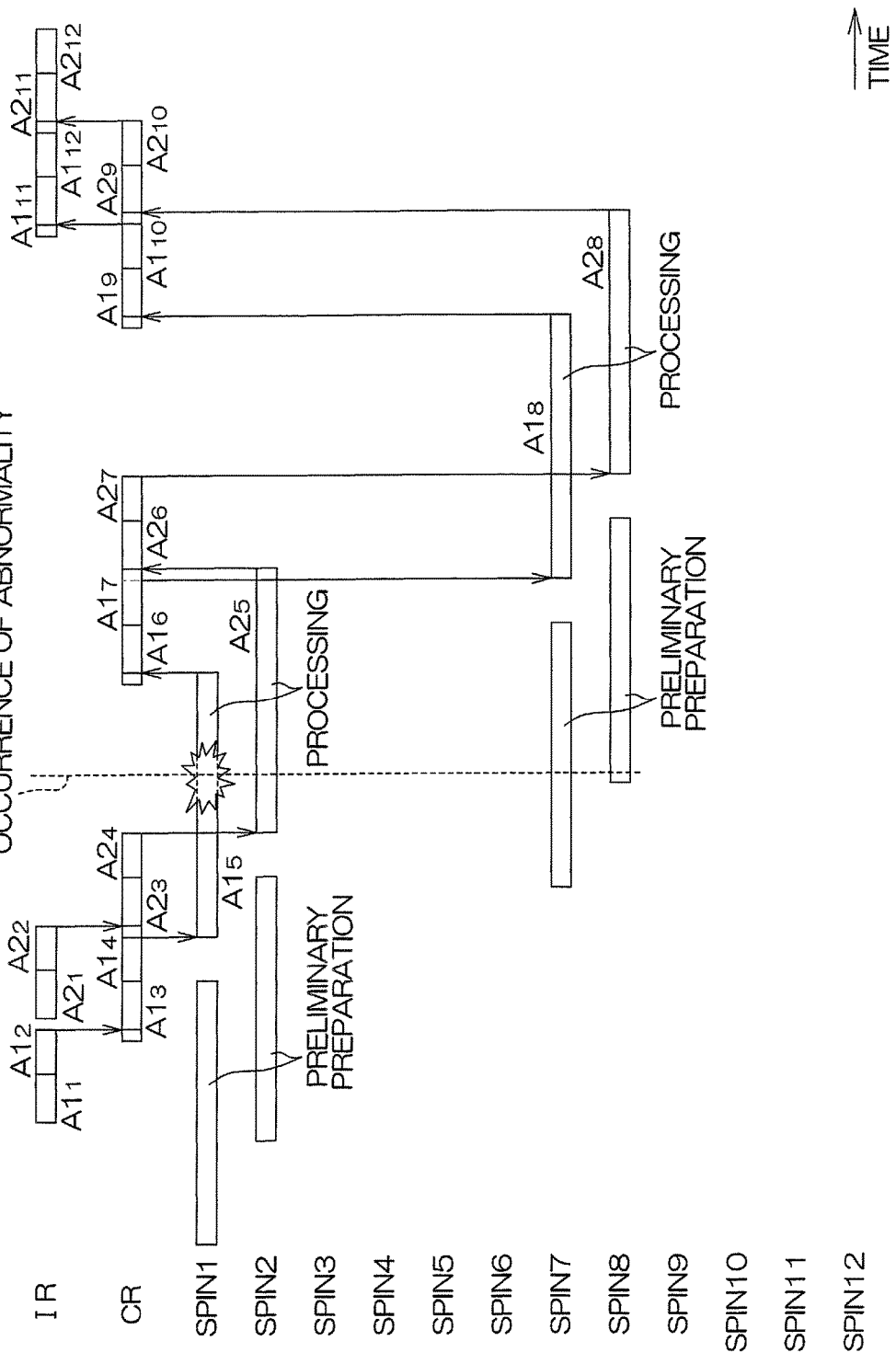
FIG. 21 is a time chart for describing the second schedule change example.

FIG. 21 shows an example where an abnormality occurs during the execution of the preliminary preparation process. More specifically, an example where an abnormality, such as stoppage of substrate transfer, etc., occurs at the processing unit SPIN1 when the preliminary preparation process is being executed at the processing units SPIN7 and SPIN8 is shown.

Figure 22:
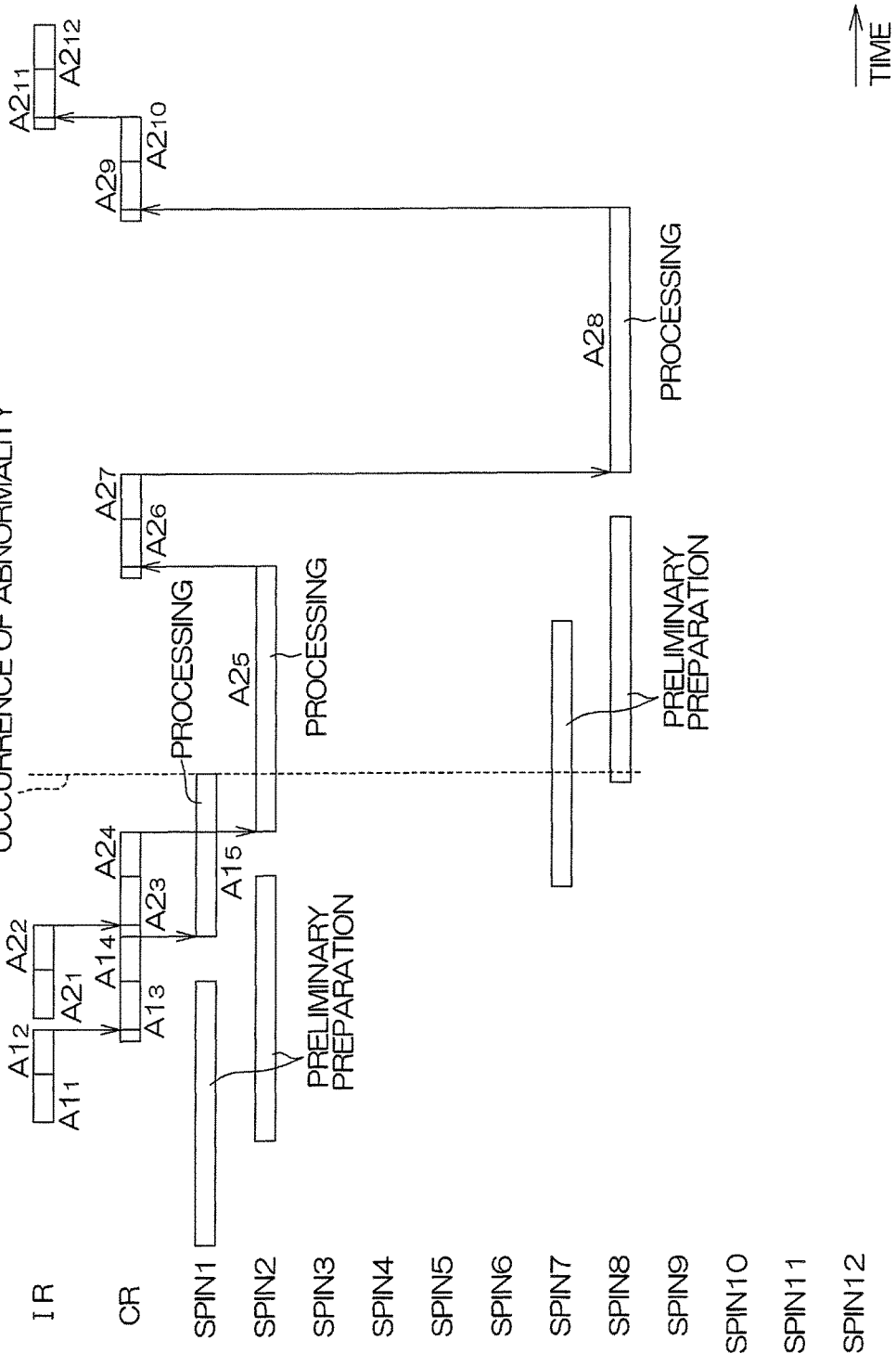
FIG. 22 is a time chart for describing the second schedule change example.

As shown in FIG. 22, when an abnormality occurs at the processing unit SPIN1 (step S24: YES), the scheduling function portion 25 performs, in regard to the blocks expressing the schedule for the substrate A1, deletion of all yet-to-be-started blocks that are planned to be later than the point of occurrence of abnormality. Further in regard to the substrate A1 processing block positioned at the space of the processing unit SPIN1, the scheduling function portion 25 deletes the portion planned to be later than the point of occurrence of abnormality and stores or makes the storage portion 23 store the deleted contents (process). Further, the scheduling function portion 25 leaves the entire preliminary preparation block positioned in the space of the processing unit SPIN7. On the other hand, the location of occurrence of abnormality is the processing unit SPIN1, which is not used for execution of the schedule for the substrate A2, and therefore the scheduling function portion 25 leaves the schedule of the substrate A2 unchanged as it is as shown in FIG. 22. The schedule for the substrate A1 is thereby changed and a new schedule is prepared for the substrate processing apparatus as a whole (steps S4 to S14).

As shown in FIG. 12, after the new schedule shown in FIG. 22 has been prepared (step S21: YES), the scheduling function portion 25 judges, before the processing execution commanding portion 26 actuates the resources of the substrate processing apparatus according to the schedule, whether or not the execution of an immediately prior schedule (at least one of the schedule for the substrate A1 and the schedule for the substrate A2) was interrupted due to an occurrence of abnormality (step S22). Here, the schedule for the substrate A1 shown in FIG. 20 was interrupted (step S22: YES) and therefore it is judged whether or not the preliminary preparation process is planned in the schedules for the substrates A1 and A2 that are scheduled to be executed (here, the schedules shown in FIG. 22) (step S27).

Figure 23:
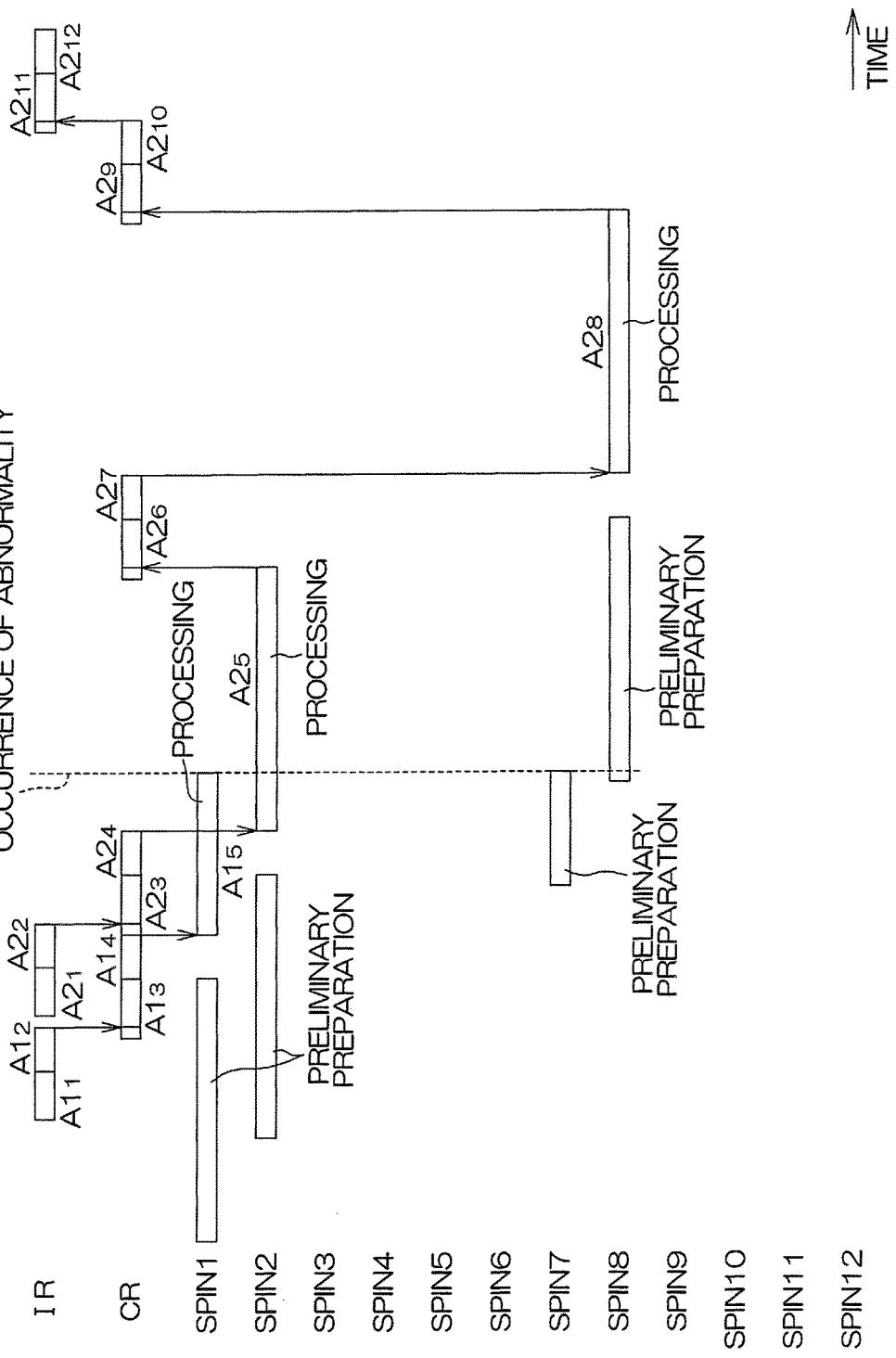
FIG. 23 is a time chart for describing the second schedule change example.

As shown in FIG. 22, at the processing unit SPIN7, the remaining process of the preliminary preparation process is planned to be later than the point of occurrence of abnormality (step S27: YES), and therefore the scheduling function portion 25 judges whether or not processing of the substrate is planned to be later than the preliminary preparation process, that is, whether or not a processing block is positioned after the preliminary preparation block for the same resource (here, the processing unit SPIN7) (step S28). As shown in FIG. 22, with the processing unit SPIN7, a processing block is not positioned after the preliminary preparation block (step S28: YES) and therefore the scheduling function portion 25 deletes the portion of the preliminary preparation block positioned later than the point of occurrence of abnormality as shown in FIG. 23 and interrupts the preliminary preparation block (step S29). The scheduling function portion 25 then stores or makes the storage portion 23 store the fact that the preliminary preparation process was interrupted together with the contents of the preliminary preparation process.

As shown in FIG. 22, at the processing unit SPIN8, the remaining process of the preliminary preparation process is planned to be later than the point of occurrence of abnormality (step S27: YES), and therefore the scheduling function portion 25 judges whether or not processing of the substrate is planned to be later than the preliminary preparation process, that is, whether or not a processing block is positioned after the preliminary preparation block for the same resource (here, the processing unit SPIN8) (step S28). As shown in FIG. 22, with the processing unit SPIN8, a processing block is positioned after the preliminary preparation block (step S28: NO) and therefore the scheduling function portion 25 skips step S29. Thereafter, the schedules for the substrates A1 and A2 shown in FIG. 23 are executed by the processing execution commanding portion 26 (step S23). That is, whereas in regard to the substrate A1, all processes planned to be later than the point of occurrence of abnormality are interrupted, in regard to the substrate A2, the initial schedule (before occurrence of abnormality) is executed.

As shown in FIG. 12, the scheduling function portion 25 judges whether or not the abnormality is resolved by a predetermined time (for example, by the scheduled end time of the schedule before change shown in FIG. 20) (step S24). If the abnormality of the substrate processing apparatus is resolved by the predetermined time (step S24: YES), the scheduling function portion 25 changes the schedule that is being executed (the schedule shown in FIG. 23) and prepares a new schedule (step S26).

Specifically, the scheduling function portion 25 positions all blocks, which, in the schedule interrupted by the occurrence of abnormality (here, the schedule shown in FIG. 21), have not been started at the point of occurrence of abnormality. In the schedule shown in FIG. 21, the blocks $A1_6$ to $A1_{12}$ are planned to be later than the point of occurrence of abnormality and therefore these blocks $A1_6$ to $A1_{12}$ are positioned again on the schedule (see FIG. 24 and FIG. 25). Also, a portion of the processing block $A1_5$, which was interrupted by the occurrence of abnormality, is also positioned again on the schedule (see FIG. 24 and FIG. 25).

Figure 24:
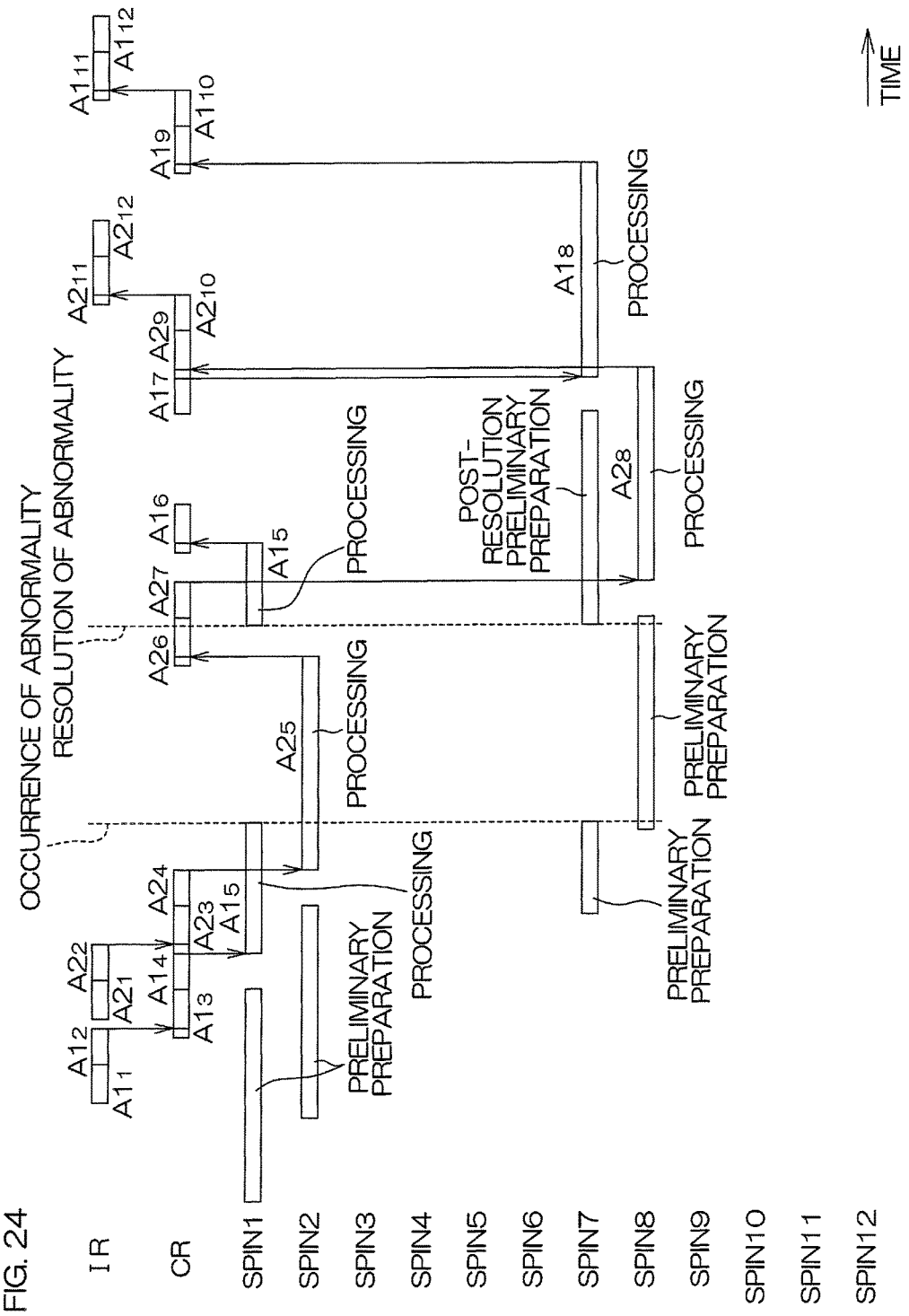
FIG. 24 is a time chart for describing the second schedule change example.
Figure 25:
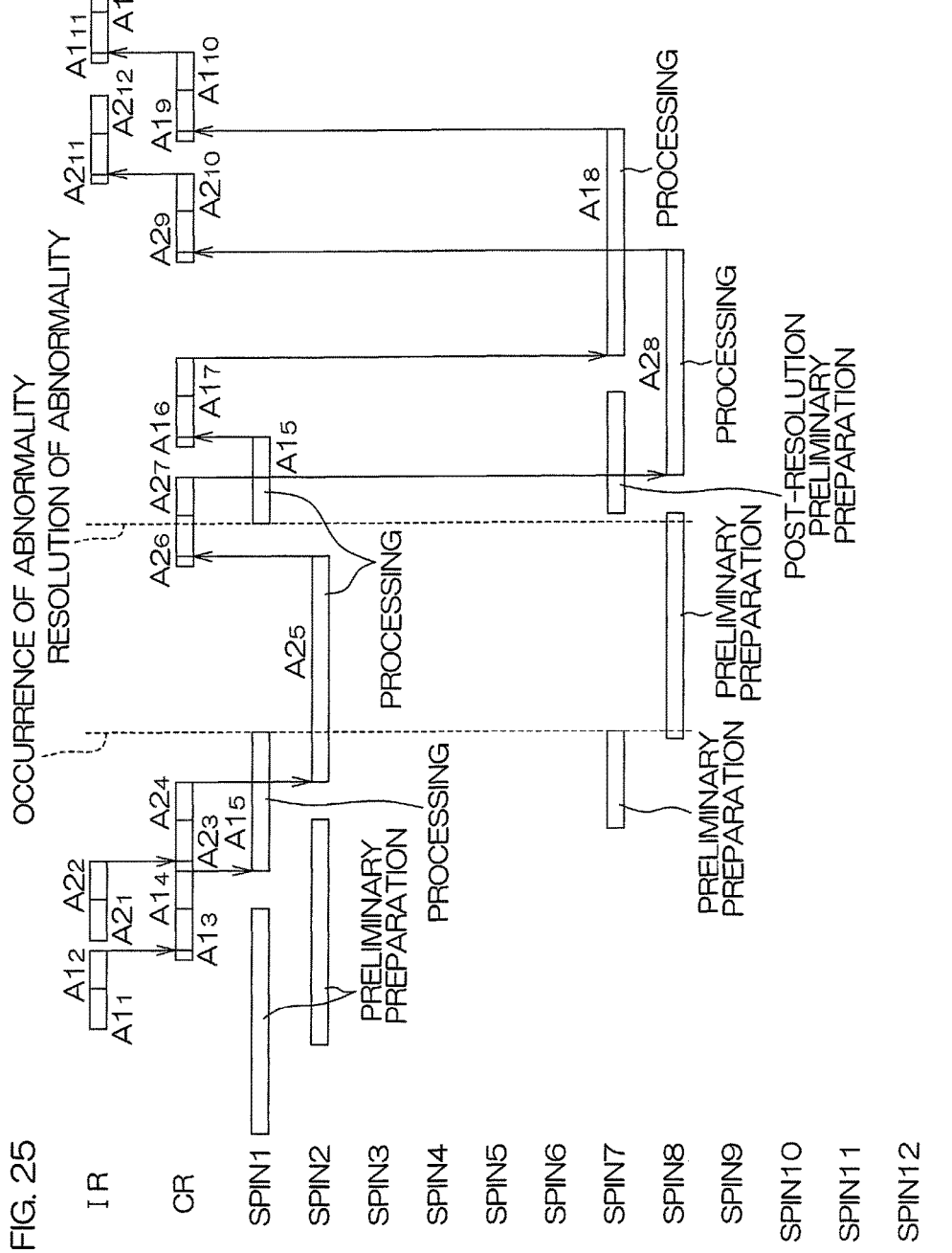
FIG. 25 is a time chart for describing the second schedule change example.

In regard to the preliminary preparation process that was interrupted by the occurrence of abnormality, the fact that the preliminary preparation process in the schedule being executed at the point of occurrence of abnormality (the schedule shown in FIG. 21) was interrupted and the contents of the interrupted preliminary preparation process are compared with the preliminary preparation execution condition described in the recipe, and whether or not repositioning of the interrupted preliminary preparation process is necessary is judged (step S11). The repositioning of the interrupted preliminary preparation process is then executed (steps S12 to S14). Consequently, as shown in FIG. 24, the preliminary preparation block is positioned as the post-resolution preliminary preparation block at the space of the processing unit SPIN7 so that the preliminary preparation process that was interrupted by the occurrence of abnormality is reset and the preliminary preparation process is started from the beginning. Or, as shown in FIG. 25, planning is performed so that only the portion of the preliminary preparation block, the execution of which was interrupted due to the occurrence of abnormality, is positioned as the post-resolution preliminary preparation block at the space of the processing unit SPIN7 and the preliminary preparation process is restarted. If the preliminary preparation process was interrupted, scheduling is performed so that the preliminary preparation process is performed from the beginning or from the middle (step S14). The schedule is thus changed and a new schedule is prepared for the substrate processing apparatus as a whole according to the resolution of abnormality.

As shown in FIG. 12, after the new schedule shown in FIG. 24 or FIG. 25 has been prepared (step S21: YES), the scheduling function portion 25 judges, before the processing execution commanding portion 26 actuates the resources of the substrate processing apparatus according to the schedule, whether or not the execution of an immediately prior schedule (here, the schedule shown in FIG. 23) was interrupted due to the occurrence of abnormality (step S22). Here, the execution of the immediately prior schedule was not interrupted due to the occurrence of abnormality (step S22: NO) and the processing execution commanding portion 26 thus starts actuating the resources of the substrate processing apparatus in accordance with the schedule shown in FIG. 24 or FIG. 25 (step S23). From the start to the end of the schedule, the controller 21 judges whether or not an abnormality has occurred in the substrate processing apparatus (step S24). If an abnormality does not occur in the substrate processing apparatus, the schedule is executed to the end without being stopped in the middle. The substrates A1 and A2 are thereby processed through the planned paths as planned.

Third Schedule Change Example

Figure 26:
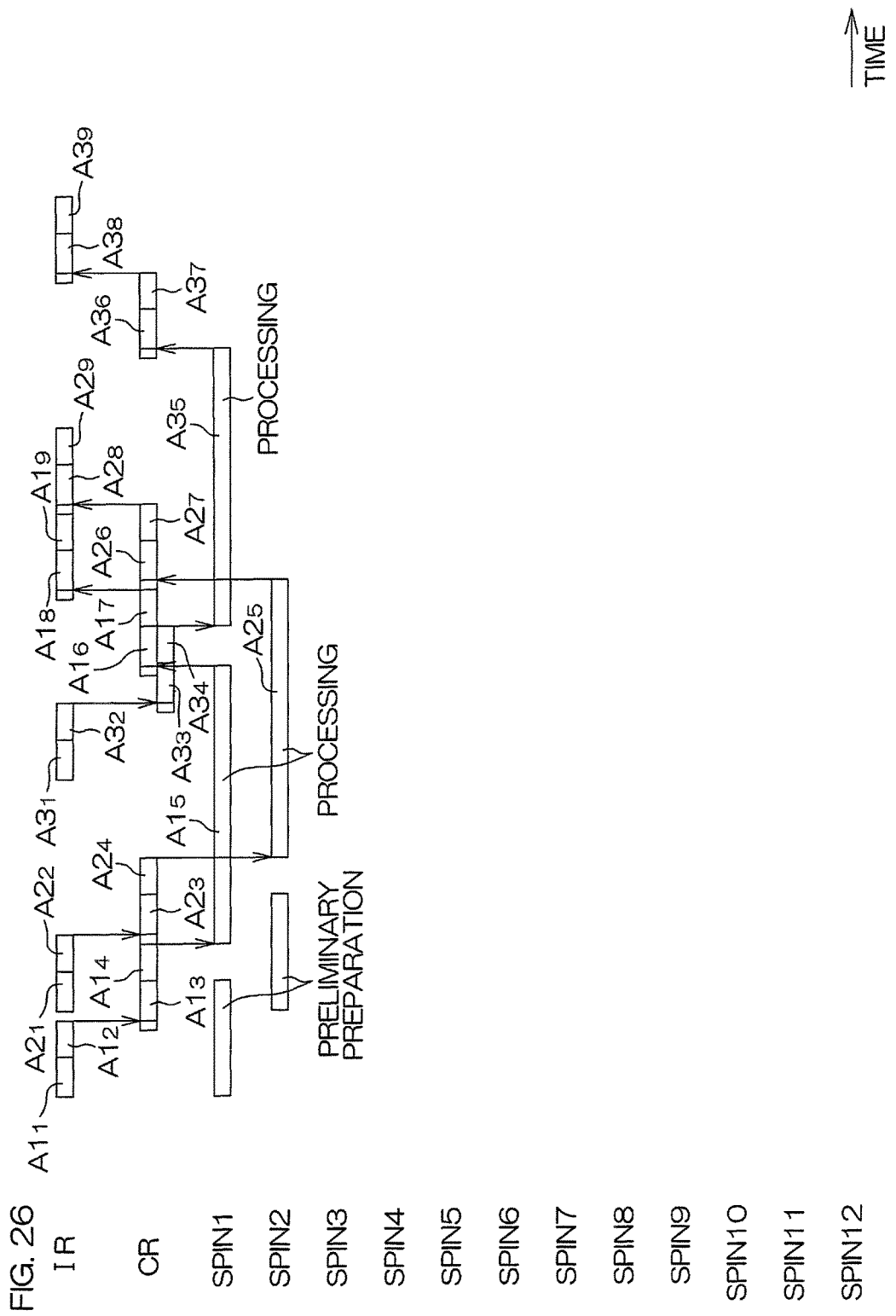
FIG. 26 is a time chart for describing a third schedule change example.

FIG. 26 is a time chart for describing an example of schedules, prepared according to the flow shown in FIG. 5, for processing three substrates A1, A2, and A3 (three substrates that are assigned the same process job code "A"). In the present schedule change example, the recipe corresponding to the process job A designates the processing units SPIN1 and SPIN2 as parallel processing units and it shall be deemed that the preliminary preparation process is commanded to be performed at the processing units SPIN1 and SPIN2.

As shown in FIG. 12, after the schedules for the substrates A1, A2, and A3 are completed (step S21: YES), the scheduling function portion 25 judges, before the processing execution commanding portion 26 actuates the resources of the substrate processing apparatus according to the schedules, whether or not the execution of an immediately prior schedule was stopped in the middle due to the occurrence of an abnormality in the substrate processing apparatus (step S22). Here, it shall be deemed that the immediately prior schedule was not interrupted (step S22: NO). The processing execution commanding portion 26 thus starts actuating the resources of the substrate processing apparatus in accordance with the schedules shown in FIG. 26 (step S23). From the start to the end of the schedules, the controller 21 judges whether or not an abnormality has occurred in the substrate processing apparatus (step S24). If an abnormality does not occur during the execution of the schedules (step S24: NO), the schedules are executed to the end (step S25: YES). On the other hand, if an abnormality occurs during the execution of a schedule (step S24: YES), the scheduling function portion 25 changes the schedule that is being executed (step S26).

FIG. 27 shows an example where an abnormality occurs at one of the parallel processing units during the execution of the preliminary preparation process at the processing units. More specifically, an example where an abnormality, such as a substrate transfer error, etc., occurs at the processing unit SPIN1 when the preliminary preparation process is being executed at the processing units SPIN1 and SPIN2 is shown. With this example, the scheduling function portion 25 removes the processing unit SPIN1, at which the abnormality occurred, from among the parallel processing units without waiting for resolution of the abnormality of SPIN1. The scheduling function portion 25 then repositions all blocks for the substrates A1, A2, and A3 that have not been started at the point of occurrence of abnormality to process the substrates A1 and A3, which were planned to be processed at the processing unit SPIN1, at the processing unit SPIN2. Specifically, as shown in FIG. 27, blocks $A1_4$ to $A1_9$ are repositioned because these have not been started at the point of occurrence of abnormality (see FIG. 28). Thereafter, as shown in FIG. 28, blocks $A2_1$ to $A2_9$ for the substrate A2 are repositioned. Thereafter, as shown in FIG. 28, blocks $A3_1$ to $A3_9$ for the substrate A3 are repositioned. The schedules are thereby changed and a new schedule is prepared for the substrate processing apparatus as a whole so that the substrates A1 and A3, which were planned to be processed at the processing unit SPIN1, are processed at the processing unit SPIN2.

As shown in FIG. 12, after the new schedule shown in FIG. 28 has been prepared (step S21: YES), the scheduling function portion 25 judges, before the processing execution commanding portion 26 actuates the resources of the substrate processing apparatus according to the schedule, whether or not the execution of an immediately prior schedule (at least one of the schedule for the substrate A1, the schedule for the substrate A2, and the schedule for the substrate A3) was interrupted (step S22). Here, the schedule for the substrate A1 shown in FIG. 27 was interrupted due to the occurrence of abnormality (step S22: YES) and therefore it is judged whether or not the preliminary preparation process is planned in the schedules for the substrates A1, A2, and A3 that are scheduled to be executed (here, the schedules shown in FIG. 28) (step S27).

As shown in FIG. 28, at the processing unit SPIN1, the remaining process of the preliminary preparation process is planned to be later than the point of occurrence of abnormality (step S27: YES), and therefore the scheduling function portion 25 judges whether or not processing of the substrate is planned to be later than the preliminary preparation process, that is, whether or not a processing block is positioned after the preliminary preparation block for the same resource (here, the processing unit SPIN1) (step S28). As shown in FIG. 28, with the processing unit SPIN1, a processing block is not positioned after the preliminary preparation block (step S28: YES) and therefore the scheduling function portion 25 deletes the portion of the preliminary preparation block positioned later than the point of occurrence of abnormality as shown in FIG. 29 and interrupts the preliminary preparation process (step S29). The scheduling function portion 25 then stores or makes the storage portion 23 store the fact that the preliminary preparation process was interrupted together with the contents of the preliminary preparation process.

Also as shown in FIG. 28, at the processing unit SPIN2, the remaining process of the preliminary preparation process is planned to be later than the point of occurrence of abnormality (step S27: YES), and therefore the scheduling function portion 25 judges whether or not processing of the substrate is planned to be later than the preliminary preparation process, that is, whether or not a processing block is positioned after the preliminary preparation block for the same resource (here, the processing unit SPIN2) (step S28). As shown in FIG. 28, with the processing unit SPIN2, a processing block is positioned after the preliminary preparation block (step S28: NO) and therefore the scheduling function portion 25 skips step S29. Thereafter, the schedules for the substrates A1, A2, and A3 shown in FIG. 29 are started by the processing execution commanding portion 26 (step S23).

As shown in FIG. 12, the scheduling function portion 25 judges whether or not the abnormality is resolved by a predetermined time (for example, by the scheduled end time of the schedule before change shown in FIG. 27) (step S24). If the abnormality of the substrate processing apparatus is resolved by the predetermined time (step S24: YES), the scheduling function portion 25 changes the schedule that is being executed (the schedule shown in FIG. 29) and prepares a new schedule (step S26).

FIG. 30 and FIG. 31 show examples where the abnormality is resolved in a period in which the second substrate A2 is being processed at the processing unit SPIN2 and before the third substrate A3 is carried out from the substrate container C. In this case, the scheduling function portion 25 restores the processing unit SPIN1 as a parallel processing unit and repositions the blocks $A3_1$ to $A3_9$ of the substrate A3 so that the third substrate A3 is processed at the processing unit SPIN1.

In regard to the preliminary preparation process at the processing unit SPIN1 that was interrupted by the occurrence of abnormality, the preliminary preparation block is positioned as the post-resolution preliminary preparation block at the space of the processing unit SPIN1 as shown in FIG. 30 so that the preliminary preparation process is started from the beginning. Or, as shown in FIG. 31, planning is performed so that only the portion of the preliminary preparation block, the execution of which was interrupted due to the occurrence of abnormality, is positioned as the post-resolution preliminary preparation block at the space of the processing unit SPIN1 and the preliminary preparation process is restarted. That is, when the abnormality of the substrate processing apparatus is resolved, whether or not the preliminary preparation process in the schedule being executed at the point of occurrence of abnormality (the schedule shown in FIG. 27) was interrupted is added to the preliminary preparation execution condition. If the preliminary preparation process was interrupted, scheduling is performed so that the preliminary preparation process is performed from the beginning or from the middle (step S14). The schedule is thus changed and a new schedule is prepared for the substrate processing apparatus as a whole according to the resolution of abnormality.

As shown in FIG. 12, after the new schedule shown in FIG. 30 or FIG. 31 has been prepared (step S21: YES), the scheduling function portion 25 judges, before the processing execution commanding portion 26 actuates the resources of the substrate processing apparatus according to the schedule, whether or not the execution of an immediately prior schedule (here, the schedule shown in FIG. 29) was interrupted due to the occurrence of abnormality (step S22). Here, the execution of the immediately prior schedule was not interrupted due to the occurrence of abnormality (step S22: NO) and the processing execution commanding portion 26 thus starts the schedule shown in FIG. 30 or FIG. 31 (step S23). From the start to the end of the schedule, the controller 21 judges whether or not an abnormality has occurred in the substrate processing apparatus (step S24). If an abnormality does not occur, the schedule is executed to the end without being stopped in the middle. The substrates A1, A2, and A3 are thereby processed through the planned paths as planned.

As described above, with the present preferred embodiment, the controller 21 prepares the schedule so that the preliminary preparation process and the substrate processing process are performed in that order at the same processing unit. When during execution of the schedule or more specifically during the period from the start of the preliminary preparation process to before the start of the substrate processing process, the controller 21 detects the occurrence of an abnormality in the substrate processing apparatus, the execution of the substrate processing process at the processing unit planned in the initial schedule (the schedule shown in FIG. 13, FIG. 20, or FIG. 26) is stopped. That is, the timing of occurrence of abnormality is before the start of the substrate processing process and therefore the execution of the process planned to be later than the point of occurrence of abnormality is stopped.

When the abnormality of the substrate processing apparatus is resolved, the controller 21 prepares the schedule so that the post-resolution preliminary preparation process and the substrate processing process are performed in that order at the processing unit designated in the initial schedule. As with the preliminary preparation process, the post-resolution preliminary preparation process is a process of preparation for the substrate processing process. As mentioned above, the timing of occurrence of abnormality is later than the start of the preliminary preparation process and therefore all or a portion of the preliminary preparation process will have been executed at the point of occurrence of abnormality. All or a portion of the preliminary preparation process and the post-resolution preliminary preparation process are thus executed in that order at the same processing unit before the substrate processing process is executed, and the two processes of preparation for the substrate processing process are executed across a time interval.

When the abnormality at the substrate processing apparatus is resolved, the controller 21 prepares the schedule thus so that the process for preparation for the substrate processing process (post-resolution preliminary preparation process) is executed anew before the execution of the substrate processing process. If the period from the occurrence of abnormality of the substrate processing apparatus to the resolution of abnormality, that is, the period from the performing of all or a portion of the preliminary preparation process to the start of the substrate processing process is long, the effects due to the preliminary preparation process will be diminished and the state of the processing unit may change from the state immediately after execution of the preliminary preparation process. Therefore by performing the process for preparation for the substrate processing process anew, degradation of the substrate processing quality can be suppressed or prevented. The substrate processing quality can thereby be stabilized.

Especially in the present preferred embodiment, the schedule is prepared so that the pre-dispensing process, which is an example of the preliminary preparation process and the post-resolution preliminary preparation process, is executed before the substrate processing process. Although the processing liquid that has changed from the initial temperature is released by the execution of the pre-dispensing process, if the time from the end of the pre-dispensing process to the start of the substrate processing process is long, the temperature of the processing liquid inside the processing liquid nozzle 51, which is an example of a processing liquid nozzle that discharges the processing liquid, will be changed from the initial temperature. Similarly, the temperature of the processing liquid inside the processing liquid piping 53, which is an example of a processing liquid piping, will be changed from the initial temperature. As mentioned above, when the abnormality of the substrate processing apparatus is resolved, the controller 21 prepares the schedule so that the process for preparation for the substrate processing process (post-resolution preliminary preparation process) is executed anew before the substrate processing process is executed. Therefore, even if the period from the occurrence of abnormality of the substrate processing apparatus to the resolution of abnormality is long, the processing liquid of a temperature within the target temperature range can be supplied to the substrate. The substrate processing quality can thereby be stabilized.

Also with the present preferred embodiment, when an abnormality of the substrate processing apparatus occurs during the execution of the preliminary preparation process, the controller 21 prepares the schedule so that not only the substrate processing process but the remaining process of the preliminary preparation process planned to be performed later than the point of occurrence of abnormality is also stopped. The preliminary preparation process is a process of preparation for the substrate processing process. Despite this, if the abnormality occurs before the start of the substrate processing process, the substrate processing process at the processing unit planned by the initial schedule is stopped. Therefore, by the controller 21 preparing the schedule so that the preliminary preparation process is stopped, the execution of a process that may be wasteful (the remaining process of the preliminary preparation process) can be prevented. Lowering of the operation rate of the substrate processing apparatus can thereby be suppressed or prevented.

Also with the present preferred embodiment, when the abnormality of the substrate processing apparatus is resolved, the controller 21 prepares the schedule so that only the remaining process of the preliminary preparation process planned to be performed later than the point of occurrence of abnormality in the initial schedule is executed as the post-resolution preliminary preparation process at the processing unit planned in the initial schedule and the substrate processing process is thereafter executed at the processing unit planned in the initial schedule. The schedule is thus prepared so that the preliminary preparation process interrupted by the occurrence of abnormality is restarted practically and all processes included in the preliminary preparation process are executed. By only the remaining process of the preliminary preparation process being executed as the post-resolution preliminary preparation process, the same process can be prevented from being executed a plurality of times. Lowering of the operation rate of the substrate processing apparatus can thereby be suppressed or prevented.

Also with the present preferred embodiment, when the abnormality of the substrate processing apparatus is resolved, the controller 21 prepares the schedule so that all processes included in the preliminary preparation process are executed as the post-resolution preliminary preparation process and the substrate processing process is executed thereafter at the processing unit planned in the initial schedule. That is, the schedule is prepared so that the preliminary preparation process is restarted practically from the beginning and the substrate processing process is executed after the post-resolution preliminary preparation process corresponding to the preliminary preparation process has been executed. The substrate processing process is thus started in a state where sufficient preparation has been made to execute the substrate processing process. The substrate processing quality can thereby be stabilized.

Also with the present preferred embodiment, when an abnormality occurs in the processing unit, planned in the initial schedule, before the substrate processing process is started at that processing unit, the controller 21 searches for a processing unit, besides the processing unit in which the abnormality occurred, that is capable of executing the substrate processing process. Specifically, if a plurality of the processing units are designated as parallel processing units capable of executing the substrate processing process in a recipe defining a processing condition and a processing procedure for the substrate, the controller 21 searches for a substitutable processing unit from among the parallel processing units. When a substitutable processing unit is found, the controller 21 prepares the schedule so that the substrate processing process is executed at that processing unit. That is, the controller 21 selects a transfer path for transferring the substrate to the processing unit and performs rescheduling in accordance with the selected path. Stagnation of the processing of the substrate can thereby be suppressed and decrease of the throughput (number of substrates processed per unit time) of the substrate processing apparatus can be reduced.

Although several preferred embodiments of the present invention have been described above, the present invention may be implemented in yet other modes.

For example, the arrangement of the substrate processing apparatus and the substrate processing contents described above with the preferred embodiment are only an example, and the substrate processing apparatus may adopt other arrangements and the present invention can also be applied to other substrate processing contents.

Also, although with each of the preferred embodiments, a case where, when an abnormality occurs, the remaining process of the preliminary preparation process is stopped and the preliminary preparation process is interrupted was described, the preliminary preparation process may be continued and the preliminary preparation process may be executed to the end after the occurrence of abnormality.

Also, although with each of the preferred embodiments, an example where an abnormality occurs when the preliminary preparation process is being executed was described, the schedule change examples described above may also be applied to a cases where an abnormality occurs in a period from the end of the preliminary preparation process to before the start of the substrate processing process.

Although with each of the preferred embodiments, the post-processing execution condition and the preliminary preparation execution condition are described inside the recipe, these may also be defined as information processing inside the scheduling program 31 that is independent of the recipe.

Also, the program 30 may be provided in a state of being incorporated in the computer 20 or may be provided in a state of being recorded in a recording medium separate from the computer 20 (a computer readable recording medium, such as CD-ROM, DVD-ROM, etc.).

Also, two or more of any of the preferred embodiments described above may be combined.

The present application corresponds to Japanese Patent Application No. 2013-129867 filed on Jun. 20, 2013 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A scheduling method by which a controller, included in a substrate processing apparatus including at least one single substrate processing type processing unit that processes substrates one at a time, prepares a schedule that defines operations of the substrate processing apparatus, the scheduling method comprising:
- a first step where the controller prepares the schedule so that a first substrate processing process, in which the processing unit processes a first substrate, a preliminary processing process, in which the processing unit performs preparation for a second substrate processing process, in which the processing unit processes a second substrate, and the second substrate processing process; are performed in order of first, the first substrate processing process, second, the preliminary processing process and third, the second substrate processing process, at the same processing unit;
- a second step where, when an abnormality occurs in the substrate processing apparatus in a period from a start of the preliminary processing process to before a start of the second substrate processing process, the controller stops the second substrate processing process at the processing unit designated in the first step; and
- when the abnormality is resolved, a third step where the controller prepares the schedule so that a post-resolution preliminary processing process, in which the processing unit performs preparation for the second substrate processing process, and the second substrate processing process; are performed in that order at the processing unit designated in the first step;
- wherein the preliminary processing process is a post-processing process in which the processing unit performs preparation for the second substrate processing process after the first substrate processing process and before the second substrate processing process and
- the third step includes:
  1) when the abnormality occurs in the substrate processing apparatus after the preliminary processing process and before the second substrate processing process and the abnormality is resolved, a confirming step of confirming elapsed time elapsed from the occurrence of the abnormality at the substrate processing apparatus to the resolution of the abnormality, and
  2) a schedule preparing step where the controller prepares the schedule so that, if the elapsed time is equal to or longer than a predetermined time, the post-resolution preliminary processing process and the second substrate processing process are performed in that order at the processing unit designated in the first step, and so that, if the elapsed time is shorter than the predetermined time, the second substrate processing process is performed at the processing unit designated in the first step without performing the post-resolution preliminary processing process.

2. The scheduling method according to claim 1, wherein the processing unit includes a cleaning liquid nozzle discharging a cleaning liquid in an interior of the processing unit and a cleaning liquid piping guiding the cleaning liquid to the cleaning liquid nozzle, and
- the preliminary processing process and the post-resolution preliminary processing process include a cleaning process of discharging the cleaning liquid from the cleaning liquid nozzle to clean at least one of the interior of the processing unit and parts disposed in the interior of the processing units.

3. A substrate processing method to be performed by a substrate processing apparatus including at least one single substrate processing type processing unit that processes substrates one at a time, the substrate processing method comprising:
- a stopping step of stopping a second substrate processing process, in which the processing unit processes a second substrate, when an abnormality occurs in the substrate processing apparatus in a period from a start of a preliminary process, in which the processing unit designated to perform the second substrate processing process performs preparation for the second substrate processing process after a first substrate processing process, in which the processing unit designated to perform the second substrate processing process processes a first substrate, to before a start of the second substrate processing process; and
- when the abnormality is resolved, a restarting step of performing a post-resolution preliminary process, in which the processing unit designated to perform the second substrate processing process in the stopping step performs preparation for the second substrate processing process, and the second substrate processing process in that order at the processing unit designated to perform the second substrate processing process in the stopping step;
- wherein the preliminary processing process is a post-processing process in which the processing unit performs preparation for the second substrate processing process after the first substrate processing process and before the second substrate processing process and
- the restarting step includes:
  1) when the abnormality occurs in the substrate processing apparatus after the preliminary processing process and before the second substrate processing process and the abnormality is resolved, a confirming step of confirming elapsed time elapsed from the occurrence of the abnormality at the substrate processing apparatus to the resolution of the abnormality, and
  2) a process performing step of performing, if the elapsed time is equal to or longer than a predetermined time, the post-resolution preliminary processing process and the second substrate processing process in that order at the processing unit designated to perform the second substrate processing process in the stopping step, and performing, if the elapsed time is shorter than the predetermined time, the second substrate processing process at the processing unit designated to perform the second substrate processing process in the stopping step without performing the post-resolution preliminary processing process.

4. A non-transitory computer-readable recording medium recording a computer program for preparing a schedule that defines operations of a substrate processing apparatus including at least one single substrate processing type processing unit that processes substrates one at a time,
- the recording medium recording a computer program incorporating a group of steps such that the method according to claim 1 is executed by the computer as the controller for the substrate processing apparatus.

* * * * *